US012792824B2

(12) United States Patent
Katta et al.

(10) Patent No.: US 12,792,824 B2
(45) Date of Patent: Nov. 10, 2026

(54) SYSTEM FOR AUTOMATICALLY GENERATING COMMENTS IN A CONTENT COLLABORATION PLATFORM USING A GENERATIVE OUTPUT ENGINE

(71) Applicant: Atlassian Pty Ltd., Sydney (AU)

(72) Inventors: Swati Katta, Mountain View, CA (US); Hannah Noordeen, San Francisco, CA (US)

(73) Assignee: ATLASSIAN PTY LTD., Sydney (AU)

( * ) Notice: Subject to any disclaimer, the term of this patent is extended or adjusted under 35 U.S.C. 154(b) by 295 days.

(21) Appl. No.: 18/757,420

(22) Filed: Jun. 27, 2024

(65) Prior Publication Data

US 2026/0004055 A1 Jan. 1, 2026

(51) Int. Cl.

| | |
|---|---|
| ***G06F 40/169*** | (2020.01) |
| ***G06F 3/0482*** | (2013.01) |
| ***G06F 3/0483*** | (2013.01) |
| ***G06F 3/0484*** | (2022.01) |
| ***G06F 40/134*** | (2020.01) |
| ***G06F 40/30*** | (2020.01) |
| ***G06N 3/0475*** | (2023.01) |

(52) U.S. Cl.

CPC .......... *G06F 40/169* (2020.01); *G06F 3/0482* (2013.01); *G06F 3/0483* (2013.01); *G06F 3/0484* (2013.01); *G06F 40/134* (2020.01); *G06F 40/30* (2020.01); *G06N 3/0475* (2023.01)

(58) Field of Classification Search

CPC .. G06F 40/169; G06F 3/04842; G06N 3/0475

See application file for complete search history.

(56) References Cited

U.S. PATENT DOCUMENTS

| | | | | |
|---|---|---|---|---|
| 10,620,783 | B2 * | 4/2020 | Beckley | G06F 16/93 |
| 11,188,967 | B2 * | 11/2021 | Ghorbani | G06F 16/9535 |
| 12,124,524 | B1 * | 10/2024 | Cheung | G06F 16/9538 |
| 12,197,478 | B1 * | 1/2025 | Mansour | G06F 16/2455 |
| 12,229,498 | B2 * | 2/2025 | Mansour | G06F 40/166 |
| 12,488,131 | B2 * | 12/2025 | Roper, Jr. | G06F 21/6218 |
| 12,505,132 | B2 * | 12/2025 | Khemani | G06F 16/2455 |
| 12,530,387 | B2 * | 1/2026 | Mauritz | G06F 16/345 |
| 12,530,659 | B2 * | 1/2026 | Kolambkar | G06F 16/355 |

(Continued)

FOREIGN PATENT DOCUMENTS

DE 102025103989 A1 * 9/2025 ............ G10L 15/26

*Primary Examiner* — Benjamin Smith

(74) *Attorney, Agent, or Firm* — Fish & Richardson P.C.

(57) ABSTRACT

Embodiments described herein related to systems and methods for generating comments in a page of a content collaboration platform. In some examples, the user interface of the platform is configured to display a page within a content region. The content region includes a comment control that, upon user selection, causes a prompt to be generated and submitted to a generative output engine via an Application Programming Interface (API). The prompt may include a portion of the content selected by a user and user-specific data, such as a user role. This data is used as context to the prompt alongside a predefined query. The output from the generative output engine may be used to generate a set of suggested comments, which are displayed in a comment interface within the content region of the content collaboration panel.

20 Claims, 13 Drawing Sheets

(56) References Cited

U.S. PATENT DOCUMENTS

| | | | | |
|---|---|---|---|---|
| 12,536,210 | B2 * | 1/2026 | Thatisetti | G06F 16/2455 |
| 12,536,505 | B2 * | 1/2026 | Wilson | G06F 3/0482 |
| 12,556,657 | B2 * | 2/2026 | Kashyap | H04N 7/155 |
| 12,561,515 | B2 * | 2/2026 | Mann | G06F 16/33295 |
| 12,566,920 | B2 * | 3/2026 | Sangarapillai | G06F 40/284 |
| 12,579,358 | B2 * | 3/2026 | Manavoglu | G06F 40/134 |
| 12,591,607 | B2 * | 3/2026 | Kim | G06F 16/2455 |
| 12,614,190 | B2 * | 4/2026 | Wilson | G06Q 30/016 |
| 12,639,316 | B2 * | 5/2026 | Hamid | G06F 16/24578 |
| 2007/0226640 | A1 * | 9/2007 | Holbrook | G06F 16/951 715/765 |
| 2007/0260588 | A1 * | 11/2007 | Biazetti | G06F 16/3338 |
| 2019/0205400 | A1 * | 7/2019 | Puzicha | H04L 51/18 |
| 2021/0133848 | A1 * | 5/2021 | Ghorbani | G06F 16/9535 |
| 2022/0172229 | A1 * | 6/2022 | Chen | G06F 40/56 |
| 2024/0256757 | A1 * | 8/2024 | Manavoglu | G06F 40/134 |
| 2024/0354641 | A1 * | 10/2024 | Miller | G06N 3/045 |
| 2024/0362278 | A1 * | 10/2024 | PerezLeon | G06F 40/40 |
| 2024/0386204 | A1 * | 11/2024 | Sangarapillai | G06F 40/284 |
| 2025/0005020 | A1 * | 1/2025 | Thatisetti | G06F 16/2455 |
| 2025/0005263 | A1 * | 1/2025 | Mansour | G06F 40/166 |
| 2025/0005264 | A1 * | 1/2025 | Woollard | G06F 16/2455 |
| 2025/0005292 | A1 * | 1/2025 | Khemani | G06F 16/2455 |
| 2025/0005523 | A1 * | 1/2025 | Katta | G06F 16/2455 |
| 2025/0005528 | A1 * | 1/2025 | Mansour | G06F 16/2455 |
| 2025/0007870 | A1 * | 1/2025 | Kim | G06F 16/2455 |
| 2025/0110975 | A1 * | 4/2025 | Shea | G06F 16/3329 |
| 2025/0111334 | A1 * | 4/2025 | Wilson | G06F 3/0482 |
| 2025/0111335 | A1 * | 4/2025 | Wilson | G06F 3/0482 |
| 2025/0111380 | A1 * | 4/2025 | Wilson | G06Q 30/016 |
| 2025/0190689 | A1 * | 6/2025 | Mansour | G06F 40/166 |
| 2025/0191048 | A1 * | 6/2025 | Fuchs | G06Q 30/0631 |
| 2025/0200208 | A1 * | 6/2025 | Roper, Jr. | G06F 21/6218 |
| 2025/0217214 | A1 * | 7/2025 | Kashyap | G06F 9/547 |
| 2025/0217371 | A1 * | 7/2025 | Hamid | G06F 16/24578 |
| 2025/0217399 | A1 * | 7/2025 | Mauritz | G06F 16/345 |
| 2025/0217576 | A1 * | 7/2025 | Mann | G06F 16/33295 |
| 2025/0220140 | A1 * | 7/2025 | Kashyap | H04N 7/155 |
| 2025/0284877 | A1 * | 9/2025 | Pandey | G06F 16/345 |
| 2025/0307041 | A1 * | 10/2025 | Kashyap | G06F 9/547 |
| 2025/0307738 | A1 * | 10/2025 | Dempsey | G06Q 10/103 |
| 2025/0307773 | A1 * | 10/2025 | Angle | G06Q 10/103 |
| 2025/0307778 | A1 * | 10/2025 | Wilson | G06Q 10/103 |
| 2025/0307840 | A1 * | 10/2025 | Wilson | G06Q 30/016 |
| 2025/0310281 | A1 * | 10/2025 | Rong | H04L 51/02 |
| 2025/0322145 | A1 * | 10/2025 | Mann | G06F 16/33295 |
| 2025/0384400 | A1 * | 12/2025 | Chakravarthula | G06Q 10/101 |
| 2026/0003701 | A1 * | 1/2026 | Williams | G06F 3/0484 |
| 2026/0004055 | A1 * | 1/2026 | Katta | G06F 40/169 |
| 2026/0004243 | A1 * | 1/2026 | Kolambkar | G06F 16/355 |
| 2026/0004244 | A1 * | 1/2026 | Kolambkar | G06Q 10/101 |
| 2026/0038008 | A1 * | 2/2026 | Ballard | G06Q 30/0282 |
| 2026/0127212 | A1 * | 5/2026 | Mauritz | G06F 16/345 |
| 2026/0134198 | A1 * | 5/2026 | Mansour | G06F 40/166 |
| 2026/0154303 | A1 * | 6/2026 | Thatisetti | G06F 16/3334 |

* cited by examiner

SYSTEM FOR AUTOMATICALLY GENERATING COMMENTS IN A CONTENT COLLABORATION PLATFORM USING A GENERATIVE OUTPUT ENGINE

TECHNICAL FIELD

Embodiments described herein relate to content collaboration platforms and, in particular, to systems that leverage large language models to generate comments within the content collaboration platform.

BACKGROUND

Content collaboration platforms are useful tools for enhancing collaboration and sharing knowledge across a team and across an organization. These platforms are also useful tools for documenting work. However, due to its ease for generating data and/or documents, it becomes more difficult for users to review and provide meaningful feedback on work.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG.

FIG.

The use of the same or similar reference numerals in different figures indicates similar, related, or identical items.

Figure 1:
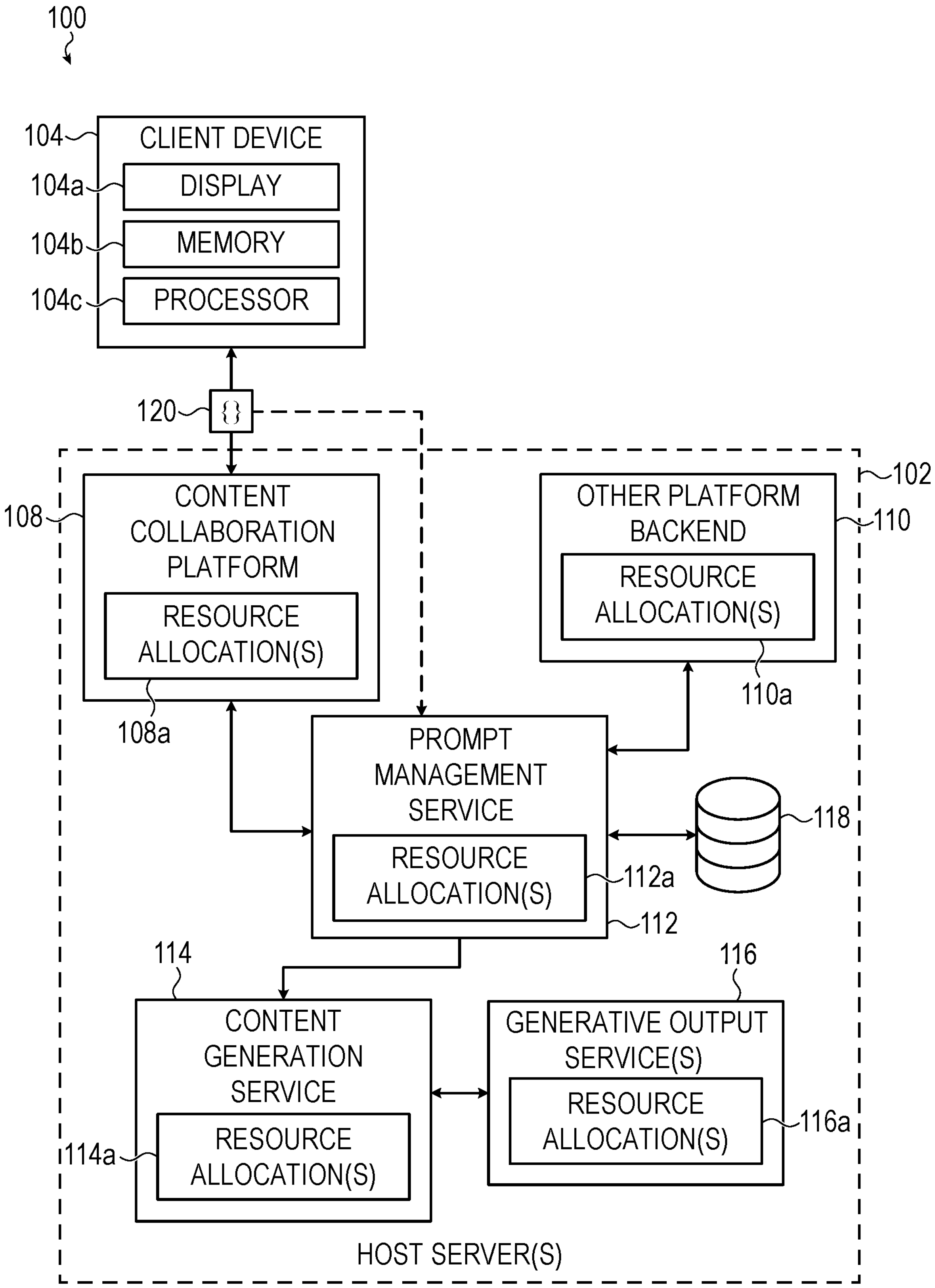
FIG. 1 depicts a simplified diagram of a system, such as described herein that can generate comments within a page of a content collaboration platform using a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

SUMMARY

Embodiments described herein relate to a system and methods for generating comments in a content collaboration platform using context extracted from the content collaboration platform and from a user profile. This context is included in an automatically-generated prompt that is conveyed to a generate output engine via an API.

In some embodiments, a method for generating comments in a page of a content collaboration platform includes: subsequent to authenticating a user operating a client device, causing display of the page in a graphical user interface of the content collaboration platform, the graphical user interface having a navigational panel including an array of tree elements arranged hierarchically, each tree element of the array of tree elements selectable to cause display of a respective page; and a content region configured to display user-generated content of the respective page in a document editor; receiving, within the content region, a first user input with respect to a comment control of the graphical user interface, the first user input including a selection of a particular portion of the user-generated content of the page; in response to the first user input: generating a prompt having prompt context data including a user role extracted from a user profile of the authenticated user and the particular portion of the user-generated content and a predefined query including a request to generate at least two candidate comments based on the prompt context data; and providing the prompt to an external generative output engine using an application programming interface call; obtaining a generative response from the external generative output engine; in response to obtaining the generative response: causing display of a comment generation interface having an editor region configured to receive user input and a set of selectable comment elements, each selectable comment element generated based on the generative response, each selectable comment element selectable by the user to cause entry of comment text within the editor region of the comment generation interface.

In some cases, the method may further include analyzing the particular portion of the user-generated content of the page with respect to a criteria, the criteria indicating that a threshold amount of content. Then, in response to a determination that the particular portion of the user-generated content does not satisfy the criteria, adjacent portions of user-generated content of the page may be extracted, the adjacent portions including at least one sentence. The prompt may be generated using the particular portion of the user-generated content and the adjacent portions of the user-generated content as prompt context. According to some embodiments, additional data may be retrieved from a database. The additional data may include metadata associated with the page and additional page text content different from the particular portion of the user-generated content of the page. Then, the prompt may be hydrated to include the metadata and the additional page text content.

In some cases, a second page of the content collaboration platform associated with the user is retrieved (the second page different from the first page), and in response to retrieving the second page, the prompt may be hydrated to include data from the second page. In some examples, a sentiment analysis is performed on the second page of the content collaboration platform to determine at least one of a tone or a writing style of the user and instructions are added regarding results of the sentiment analysis to the prompt, including adopting the writing style of the user in the output.

In some cases, the system may receive, at an editor region, a textual input from the user. In response to the textual input from the user, a second prompt including the textual input from the user may be generated. Then, the second prompt may be submitted to the external generative output engine and an updated generative response from the external generative output engine based on the textual input from the user may be received. The set of selectable comment elements may be replaced with an updated set of selectable comment elements. In some cases, the particular portion of the user-generated content of the page is an in-line comment from a different user.

In some embodiments described herein, a method for automatically generating suggested comments in a content collaboration platform may include: subsequent to authenticating a user operating a client application on a web browser, causing display of the page in a graphical user interface of the content collaboration platform, the graphical user interface of the content collaboration platform including a navigational panel including an array of tree elements arranged hierarchically, each tree element of the array of tree elements selectable to cause display of a respective page and a content region configured to display user-generated content of the respective page in a document editor, the content region comprising a comment region including a text input region and configured to receive and display user comments; receiving, within the comment region, a comment request from the user; in response to the comment request: generating a prompt having prompt context data including a user attribute obtained from a user profile of the authenticated user, document content from the page, an existing comment within the comment region, and a predefined query including a request to generate at least two suggested comments based on the prompt context data; submitting the prompt to an external generative output engine using an application programming interface call; obtaining a generative response from the external generative output engine; in response to obtaining the generative response: generating a set of suggested comments based on the generative response; causing display of a comment generation interface having a set of selectable comment elements, each selectable comment element selectable by the user to cause entry of a suggested comment from the set of suggested comments within the text input region of the comment region.

In some cases, the predefined query includes instructions for the generated at least two suggested comments to be different from the existing comment. In some examples, in response to receiving the comment request, a selection of a portion of the document content of the page may be requested. Subsequent to receiving the selection of the portion of the document content of the page, the prompt may be hydrated by adding the portion of the document content of the page and the set of suggested comments may be generated based on the generative response obtained from the hydrated prompt. In some examples, a textual input from the authenticated user may be received at the input region and a second prompt may be generated. The second prompt may include at least a portion of the textual input, the predefined query including instructions to generate the set of suggested comments using the at least a portion of the textual input and a topic extracted from the at least a portion of the textual input. Subsequent to receiving an updated set of suggested comments, replacing the set of selectable comment elements based on the updated set of suggested comments. In some embodiments, the user attribute is a user role of the authenticated user within the content collaboration platform. In some cases, the user attribute includes a previous comment from the authenticated user on a different page within the content collaboration platform.

In some cases, the method also includes accessing, via an Application Programing Interface (API), a link path associated with an existing page; generating a first suggested comment from the set of suggested comments including the link path, the link path including hosted data from the existing page; and causing display of the first suggested comment including the link path having a preview of the hosted data, the link path selectable to cause display of the existing page, the existing page different from the page.

In some embodiments described herein a method for suggesting in-line comments in a page of a content collaboration platform may include: subsequent to authenticating a user operating a client device, causing display of the page in a graphical user interface of the content collaboration platform, the graphical user interface of the content collaboration platform having a navigational panel including an array of tree elements arranged hierarchically, each tree element of the array of tree elements selectable to cause display of a respective page, and a content region configured to display user-generated content of the respective page in a document editor; receiving, within the content region, a first user input with respect to a comment control of the graphical user interface, the first user input including a selection of a particular portion of user-generated content of the page; in response to the first user input: generating a prompt including prompt context data including a user role extracted from a user profile of the authenticated user, title of the page, and the particular portion of the user-generated content, and a predefined query including a request to generate at least two candidate comments based on the prompt context data; providing the prompt to an external generative output engine using an application programming interface call; obtaining a generative response from the external generative output engine; in response to obtaining the generative response: causing display of a comment generation interface having an editor region configured to receive user input, and a set of selectable comment elements, each selectable comment element generated based on the generative response, each selectable comment element selectable by the user to cause entry of comment text within the editor region of the comment generation interface; receiving, a selectable comment element from the set of selectable comment elements; and prepopulating the editor region with the selectable comment element from the set of selectable comment elements.

In some cases, the method further includes: receiving, from the user, an edited portion of the selectable comment element; generating a second prompt using at least the edited portion of the selectable comment element; receiving, from the external generative output engine, an additional set of candidate comments; and replacing the set of selectable comment elements with an updated set of selectable comment elements, the updated set of selectable comment elements based on the additional set of candidate comments. In some examples, in response to a user selection of an additional selectable comment element from the updated set of selectable comment elements, the additional selectable comment element may be added to the editor region including the selectable comment element.

In some cases, the prompt context data may further include issue content from one or more issues hosted by issue tracking platform, the one or more issues associated with the user; and at least one selectable comment element includes a graphical user interface element selectable to display a selectable link to an issue hosted by the issue tracking platform. In some examples, the method may also include retrieving user access logs associated with the user, user access logs comprising other pages within the content collaboration platform associated with the user and hydrating the prompt to include a portion of the user access logs including the other pages. In some examples, the comment generation interface may include a tone control having a plurality of selectable tones and the prompt further includes tone instructions that correspond to a particular tone of the plurality of selectable tones, the particular tone selected by the user.

DETAILED DESCRIPTION

Embodiments described herein relate to systems and methods for generating comments (in-line or end-of-page) within a page of a content collaboration platform using a generative output engine. The system is configured to generate a prompt that includes context, which enables the generative output engine to provide a tailored output (suggested comments to a page) to each user. For example, the context may include content from the page, user attributes extracted from a user profile, pages or other content associated with the user, and the like. The output from the generative output engine is used to generate a set of suggested comments, displayed within a content panel of the content collaboration platform as selectable elements that the user can select to post the comment and/or edit.

Modern enterprises employ online tools, like content collaboration platforms, to generate and document project data. Often, content collaboration platforms allow a team of users to collaborate on a page or in a space to generate project deliverables. However, as the amount of content in content collaboration platforms grows, collaboration becomes harder for users. For example, a subject matter expert on a topic may wish to provide feedback or comment on all the project relating to the subject matter expert's expertise, yet with the amount of content, this task may be impracticable for a single individual using traditional tools.

Similarly, as the amount of content grows, users reviewing the pages of other users may not have time to provide comments on the page due to difficulty articulating input or difficulty formulating questions. For example, many users may not be comfortable with the language and refrain from providing any input. In some cases, users may also opt to leave generic comments that are minimally useful to the author of the page. As a result, collaboration in pages may decrease and the author of those pages may have no visibility on the needs of the team or the organization. Thus, pages may become stale and the functionality of the content collaboration platform may not be fully explored.

Systems and methods described herein automatically generate suggested comments (in-line or end-of-page) in a page of a content collaboration platform. The system leverages data from the page, data from the user profile, data from the pages or other content associated with the user, and data from other content from other platforms associated with the user to provide context to the generative output engine (also referred to as a large language model, external large language model, or external generative output engine) in order to obtain a user-tailored output. This output is used to generate suggested comments which are displayed in a comment generation interface window of the content collaboration platform as selectable comment elements. The user may select a selectable comment element to prepopulate an editor portion of the comment generation interface and/or post the suggested comment as-is.

Generally, the content collaboration platform includes a user interface having a navigational panel and a content region. The navigational panel includes selectable elements that allows the user to navigate to different spaces, pages, blogs, and the like. In some cases, the navigational panel includes a page tree having an array of hierarchically-arranged, user-defined tree elements, each of which are selectable to cause display of a page selected by the user. The page is generally displayed in the content region (or content panel) of the user interface. In some examples described herein, within the content region, the user may select a selectable control to write a comment within the page. The selectable control may be displayed in response to a user selecting a particular portion of the content of the page (e.g., to leave an in-line comment) or by navigating to a comment region within the comment panel (e.g., an end-of-page comment). In response to the selection of the selectable control, a prompt management service is launched at the backend to generate a prompt that is fed into a generative output engine (also referred to herein as a large language model (LLM)).

The generated prompt may include prompt context and a predefined query. The predefined query may include a request for the LLM to generate a set of suggested comments, criteria for generating the suggestions, and other restrictions. Prompt context includes the user-specific and the page-specific data that is provided to the LLM for generating tailored suggestions. In some examples, prompt context includes the particular portion of the content of the page selected by users. In some examples prompt context includes all the content or a significant portion of the content of the page for which suggested comments are being generated. In some examples, the prompt context includes page metadata. In some cases, prompt context also includes user-specific information, such as a user attribute extracted from a user profile (e.g., user role, user name, and the like). In some cases, the prompt context may also include data from previous comments or previous writings from the user. This data may be used to analyze a user's writing style, tone, demeanor, and the like, and generate suggested comment that mirrors the user's style. In some cases, a sentiment analysis may be performed on the particular selected text and/or the user's writing style to determine if a negative, positive, critical, or an inquisitive comment is generated given the context. In some cases, the prompt context may include pages within the content collaboration platform associated with the user. These pages may be used, for example, to pinpoint related pages and link those pages in the comments. In some cases, prompt context may include data from other federated platforms, such as an issue tracking system. In this case, an issue item related to the comment may be identified and a selectable link may be generated within the comment.

Once the prompt is generated, the prompt is provided to the LLM via an application programming interface (API) call. The output from the LLM is evaluated and used to generate a set of suggested comments. The set of suggested comments may be displayed within a comment generation interface window within the content region of the content collaboration platform as a respective selectable element. The comment generation interface window may include an editor region that allows a user to type and/or edit a comment and the set of selectable comment elements. Each of the selectable comment elements may be selectable to cause entry of the comment within the editor region.

In some cases, upon entry of the comment within the editor region, a user may select a post button to cause the comment to be posted within the page. In some examples, the user may edit or to provide a different comment or comment portion within the editor region. In this example, upon a user providing additional textual input, the additional textual input is used to generate a second prompt that is hydrated with the additional textual input. Then, the second prompt having the additional context is submitted to the LLM. In this case, the output of the LLM may be used to generate a new set of comments based on the additional textual input. The set of selectable comment elements are then replaced with new selectable comment elements corresponding to the new set of comments.

In some cases, the system may evaluate whether sufficient context is provided. As one example, for in-line comments, the user may select a single word or a limited number of words from the page. Based on a criteria, the system evaluates if the selected content is sufficient. If the selected content fails this criteria, the system may fetch additional content from the page. For example, the system may fetch adjacent sentences or the paragraph in which the initial content was selected. This additional content is then automatically added to the prompt as context.

These foregoing embodiments and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Scalable Network Architecture for Automatic Content Generation

A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding.

In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples).

In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

A sample prompt may be:

{
You are tasked to provide a bulleted list of 3 to 5 possible reactions, safe for work emojis, comments or questions for a user who is a ${userRole} might have for the input text.
You generate text only in ${locale} language irrespective of the language of input text.
You must adhere to the following rules:
You must ensure to only generate possible reactions, emojis, comments, or questions for the input text.
Generated about 3-5 reactions, comments, or questions.
Your generated text must not include the <text></text> tag,
You must not generate any leading or trailing messages.
<text>< #if userInstruction?has_contexnt>${userInstruction} <#else>${context}<#if></text>}

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, “lexical elements” may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of “can a computer” invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be “can a computer supplied with a 30 W power supply consume 60 W of power?” A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as “generated text” or “generated output” provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, the generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of “what is the syntax for a while loop in C and how does it work” may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string “this document corresponds to project ID 123456, status of which is pending.” In this example, a suitable LLM prompt may be provided that causes the LLM to determine an association between the documentation platform and a project management platform based on the reference to “project ID 123456.”

In response to this recognized context, the LLM can wrap the substring “project ID 123456” in anchor tags with an embedded URL in HTML-compliant syntax that links directly to project 123456 in the project management platform, such as: “<a href='https://example link/123456>project 123456</a>”.

In addition, the LLM may be configured to replace the substring “pending” with a real-time updating token associated with an API call to the project management system. In this manner, this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Example System Architecture

FIG. 1 depicts a simplified diagram of a system 100, such as described herein, that is configured to automatically generate comments within a page of a content collaboration platform using a generative output engine. The system 100 is depicted as implemented in a client-server architecture, but it may be appreciated that this is merely one example and that other communications architectures are possible.

The system 100 includes a set of host servers 102 which may be one or more virtual or physical computing resources (collectively referred in many cases as a "cloud platform"). In some cases, the set of host servers 102 can be physically co-located or in other cases, each may be positioned in a geographically unique location.

The set of host servers 102 can be communicably coupled to one or more client devices; such as a client device 104. The client device 104 can be implemented as any suitable electronic device. In many embodiments, the client device 104 is a personal computing device such as a desktop computer, laptop computer, or mobile phone.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform. Further, the generative output engine can be used to generate subtasks based on a parent issue and context associated with the parent issue.

Turning to FIG. 1, a portion of the set of host servers 102 can be allocated as physical infrastructure supporting a content collaboration platform 108 and a different portion of the set of host servers 102 can be allocated as physical infrastructure supporting a other platform(s) backend 110. In some examples, other platform(s) may refer to any of an issue tracking platform, a software management platform, a project management platform, a blackboard service, and the like.

Each of the platforms, 108 and 110, may be instantiated over physical resources provided by the set of host servers 102. Once instantiated, respective frontends for each of the platforms are rendered.

More specifically, the content collaboration platform 108 backend can be configured to communicably couple to an issue tracking platform frontend instantiated by cooperation of a memory and a processor of the client device 104. Once instantiated, the issue tracking platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104*a*-104*c*, respectively.

As with many embodiments described herein, the content collaboration platform frontend can be configured to communicate with the content collaboration platform 108. In many embodiments, as noted above, the client device 104 can be configured to send an authentication token 120 along with each request transmitted to any of the content collaboration platform 108, a prompt management service 112, and the like.

A prompt management service 112 can be configured to receive user input (provided via a graphical user interface of the client device 104 or the client device 106) from the content collaboration platform 108 as well as from other platforms 110 (e.g., the issue tracking platform, a project management platform, and the like). The user input may cause the prompt management service 112 to generate a prompt to be submitted and performed by the generative engine service 116.

The prompt management service 112 can be configured to modify the user input, and to supplement the user input, such as by communicating with a comment generation service 114 and accessing a database (e.g., database 118) corresponding to content in the content collaboration platform 108 and/or content in other platforms 110 to obtain information indicated by the comment generation service 114. The comment generation service 114 may instruct or obtain context to be used for generating a prompt (by the prompt management service 112). For example, the comment generation service 114 may determine that a user role from a user profile, a portion of the content of a page in the content collaboration platform 108, and/or other user logs (e.g., recently-edited pages, issue items, and the like) may form part of the content provided to the generative output engine.

Additionally, the prompt management service 112 can be configured to select a prompt from a database (e.g., the database 118) based on the user input, insert context into a template prompt, and so on. The prompt management service 112 may also be referred to herein as herein as a "prompt constructor" or as a "prompt management agent." In some cases, the prompt management service 112 is also referred to as a "content creation and modification service."

Output of the prompt management service 112 can be referred to as a hydrated prompt. This modified prompt can be provided to the generative engine service 116 as an input. More particularly, the prompt management service 112 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 112 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a hydrated prompt as input, the generative engine service 116 can execute an instance of a generative output engine, such as an LLM. As noted above, in some cases, the prompt management service 112 can be configured to specify what engine, engine version, language, language model or other data should be used to continue a particular modified prompt. The selected LLM or other generative engine continues the input prompt and returns that continuation to the caller, which in many cases may be the prompt management service 112.

As described herein, a generative output engine service 116 may be hosted over the host servers 102 or, in other cases, may be a software instance instantiated over separate hardware. In some cases, the generative engine service may be a third party service that serves an API interface to which one or more of the host services can communicably couple.

The generative output engine can be configured as described above to provide any suitable output, in any suitable form or format. Examples include generating suggested comments (e.g., in-line comments or page comments) in a page of a content collaboration platform.

For example, as noted above, the generative engine service 116 can be used to generate content, supplement content, and/or generate API requests or API request bodies that cause one or more actions, such as generating suggested comments and/or causing comments to be posted in the page of the content collaboration platform. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance.

In some cases, output of the generative engine service 116 can be provided to an output processor or gateway configured to generate suggested comments in the content collaboration platform 108. For example, output of the generative engine service 116 can be inserted into an API request directly to a backend associated with the content collaboration platform 108. The API request can cause the backend of the documentation system to update an internal object representing the issues to be created. Once created, a frontend may be updated so that a user of the client device can review and consume the generated content.

More generally, the embodiments described herein and with particular reference to FIG. 1 relate to systems for generating suggested comments, collecting relevant context data (e.g., user data, content of the page), and compiling the context into a prompt to be submitted to a trained large language model. The output of the LLM can be used to generate the comments and/or to further fetch more content to fine-tune or elaborate on comments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the content collaboration platform 108 may be instantiated by cooperation of a processor and memory collectively represented in the figure as the resource allocations 108*a*.

Similarly, the other platform(s) backend 110 may be instantiated over the resource allocations 110*a* (including processors, memory, storage, network communications systems, and so on). Likewise, the prompt management service 112 is supported by a processor and memory and network connection (and/or database connections) collectively represented for simplicity as the resource allocations 112*a*.

The comment generation service 114 can be supported by its own resources including processors, memory, network connections, displays (optionally), and the like represented in the figure as the resource allocations 114*a*.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116*a*.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 112 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Example Frontend

FIGS. 2A-3B depict example frontend interfaces of a content collaboration platform that can initiate and/or interact with a prompt management service and a generative output engine to generate comments in a page within the content collaboration platform.

Figure 2A:
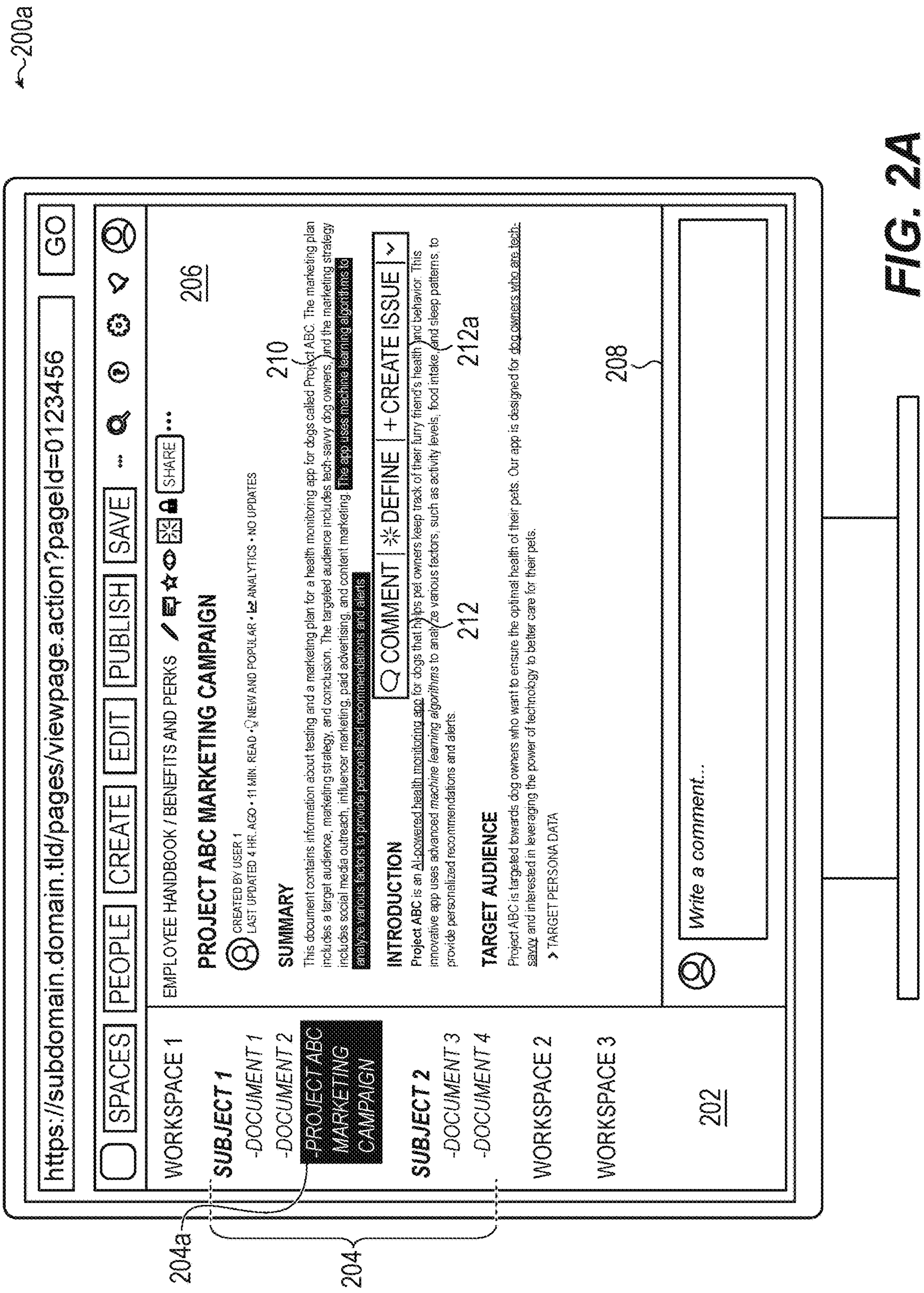
FIGS. 2A-2C depict an example user interface of a content collaboration platform that generates suggested in-line comments within a page.
Figure 2B:
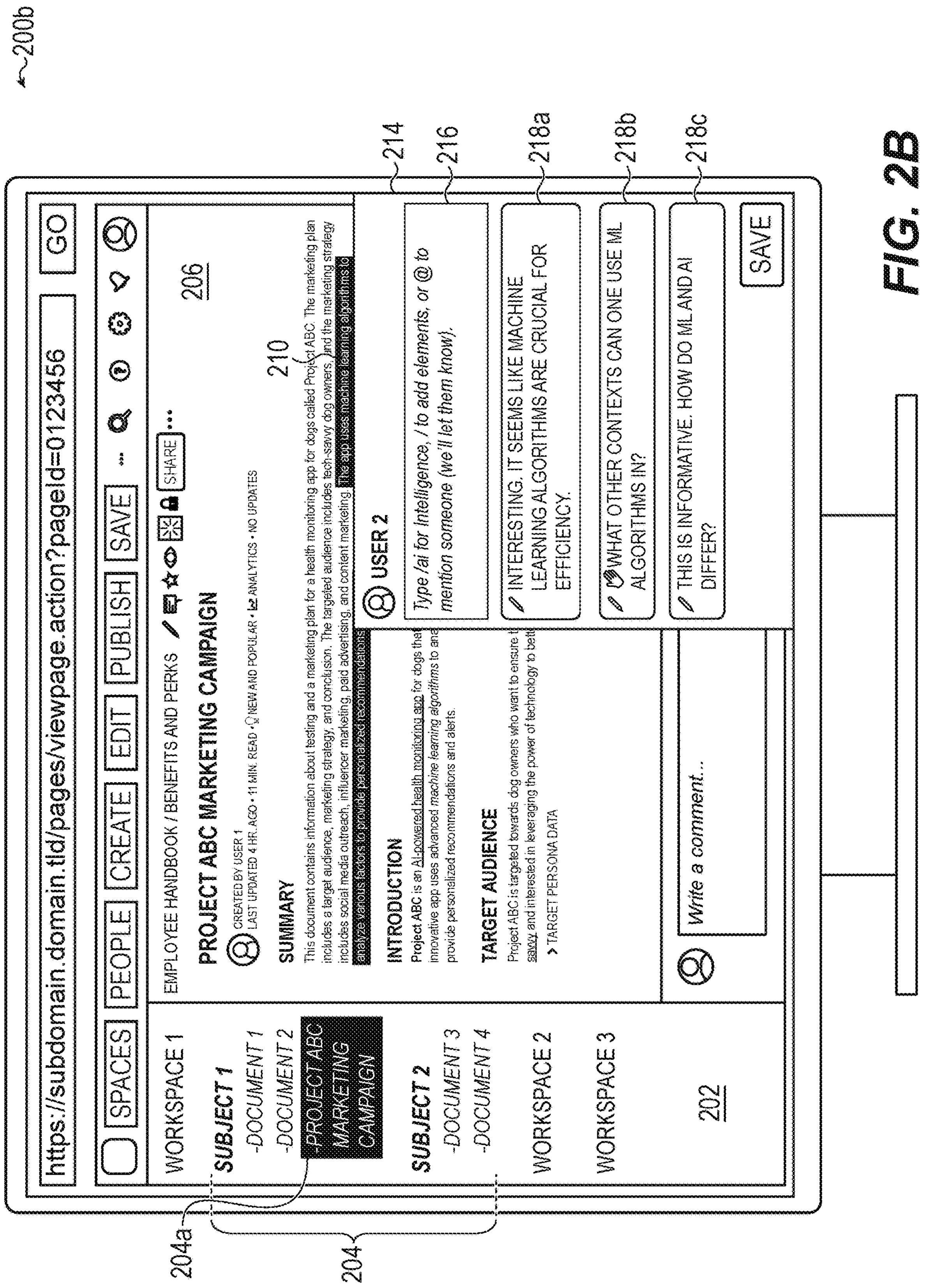
Figure 2C:
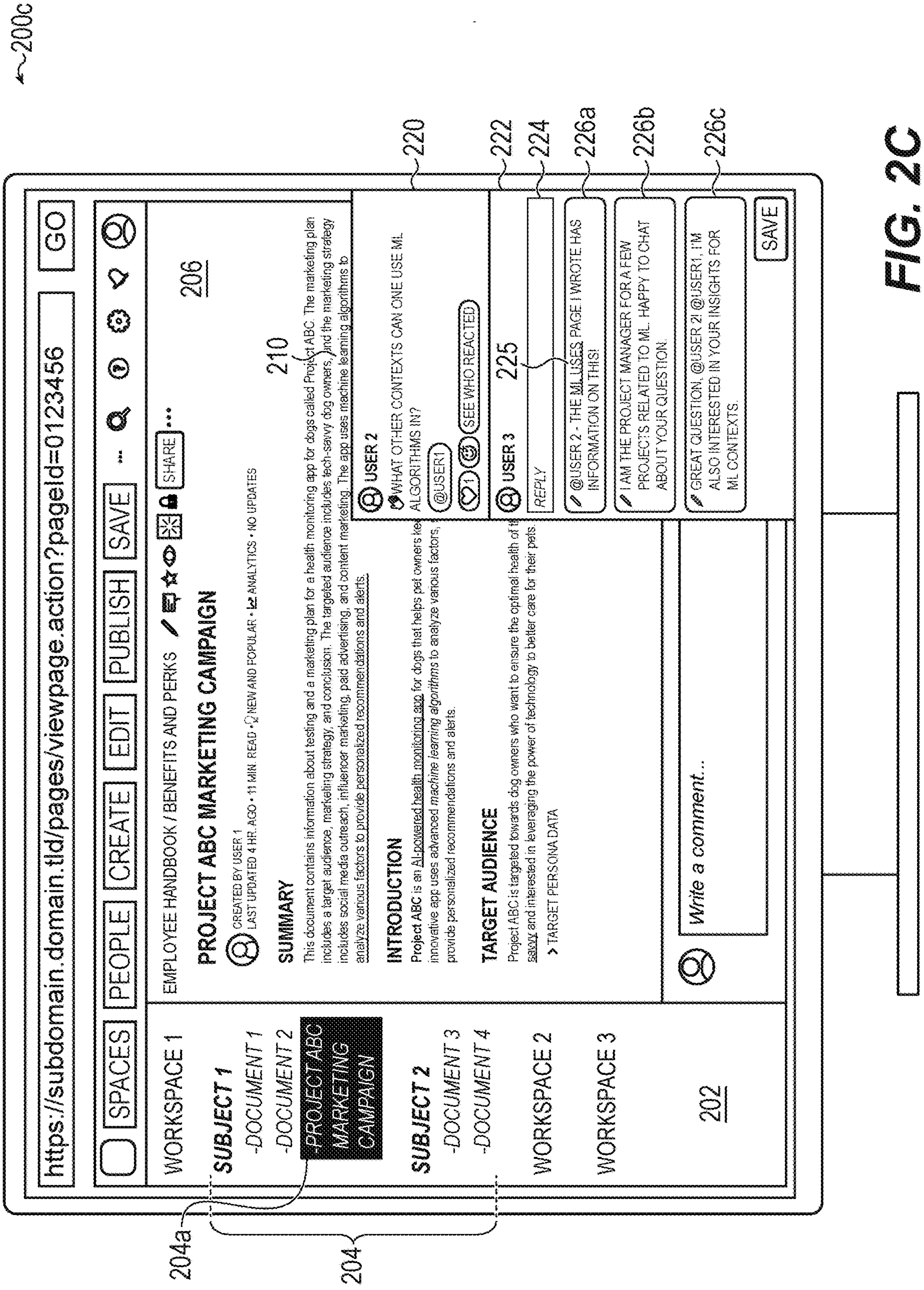

FIGS. 2A-2C depict an example interface for generating in-line comments in a page. It should be noted that while a page or document within a content collaboration platform is explained below, a page is a non-limiting example. This disclosure is directed to adding a comment to a content item in a federated platform. Accordingly, the examples below can be extended to other content items, including issue items, tasks, blogs, transcripts, and other types of content items.

As depicted in FIG. 2A, a content collaboration platform user interface 200*a* may generally be organized by workspaces (or simply "spaces"). Each of these spaces may be tailored to a particular project, team page, or the like. Each space may have unique user permissions (e.g., administrator privileges, view privileges, and the like) for each user and/or for each user group, depending on the settings of the space. More importantly, each space may be configured to store documents (referred to herein as "pages"). Each page includes user-generated content that is viewable and editable by multiple users via the client application (e.g., generally a web browser) of the content collaboration platform.

The pages in a space may be organized hierarchically to allow the users to define relationships (parent, child) between pages. This hierarchical organization is shown in a navigational panel 202 of the user interface 200*a*. The navigational panel 202 may include a page tree 204. The page tree 204 displays tree elements (corresponding to pages) in the hierarchical organization. Each of the tree elements in the page tree 204 is selectable. A selection of a particular tree element (e.g., tree element 204*a*) causes display of a page in a content panel 206. It should be noted that while FIG. 2A depicts the hierarchical organization in terms of subjects, any user-defined hierarchical organization is envisioned.

The content panel 206 is configured to display page content of the selected page. The page content may include title, text, images, videos, or any other media. In some cases, the content panel 206 displays other data, such as author, last revisions, and the like. In some cases, the content panel 206 includes a comment region 208 which allows users to leave a comment on the page.

In some cases, a user may select a portion of the content to leave an in-line comment. For example, a user may select a particular portion 210 of the text of the page. In this case, the portion 210 is a sentence within the page. Upon a user selection of this portion 210, a comment window 212 may be displayed. Generally, the comment window 212 may be a pop-up window adjacent to the selected portion 210. In some cases, the comment window 212 may be a separate panel or another user interface element. The comment window 212 may include a control 212*a*, (e.g., CREATE COMMENT), which launches the comment generation service 114 discussed in FIG. 1 above.

FIG. 2B shows an example user interface 200*b* once the user selects the create comment control 212*a*. As depicted, upon the user selecting the create comment control 212*a*, a comment generation interface 214 is displayed. The comment generation interface 214 includes an editor region 216 and a set of selectable elements 218*a-c* corresponding to a respective suggested comment, which are selectable.

The editor region 216 allows a user to provide textual input or other content (e.g., emojis, images, links, and the like). The editor region 216 may be configured to accept rich text or special formatting that is processed in order to preserve the formatting or enable an output that can be converted back into a rich text or formatted content native to the requesting platform. The context may be a string value type if it includes text and may be a float or other value type if it includes a pointer to or identifier of a file or other resource.

The set of selectable elements 218*a-c* corresponding to a suggested comments may be generated via a generative output engine, such as via a generative output service 116 from FIG. 1. In this example provided, the generative output engine may receive a hydrated prompt that includes context from which the generative output engine provides its output. Specifically, the user in this case selected content 210. In some cases, this particular content 210 may be part of the context. The prompt generation service may, for example, include instructions to provide comments based on and/or focusing on the particular selected content 210. In this case, the particular content 210 includes the sentence: "The app uses machine learning algorithms to analyze various factors to provide personalized recommendations in alert." Based on this sentence, the set of selectable elements 218*a-c* corresponding to a respective suggested comment include a particular observation pertaining to machine learning algorithms (e.g., selectable element 218*a*), a question regarding other ML contexts (e.g., selectable element 218*b*), and a clarifying question regarding ML and AI (e.g., selectable element 218*c*).

While in the example above, a full sentence was selected, in some cases, the user may select less content (e.g., a single word, few words less than a sentence, a single letter, a single character) which may not provide sufficient context for providing a comment. In this case, the prompt generation service may include a sufficient context criteria to determine if the selected comment is sufficient to generate a relevant comment. In this case, the prompt generation service may provide an output that includes whether the sufficient context criteria has been met. If the sufficient context criteria fails, the prompt generation service may fetch additional context, such as adjacent words, sentences, or paragraphs and hydrate the prompt to include the additional context. In some cases, the criteria may be based on a minimum amount of content. For example, the criteria may include a minimum of one paragraph, three sentences, one sentence, or the like, to generate the prompt. In other cases, the criteria may include at least one non-generic phrase (e.g., a phrase that pertains to the content of the page without including articles, fillers, or other not-topic-specific language).

In some cases, the entire content of the page may be provided as context to the generative output engine. In other examples, select content (e.g., title, conclusion, introduction) may be provided to the generative output engine as context to generate the suggested comment.

Based on the example of FIG. 2B, the suggested comments may also be based on one or more attributes of a user profile. For example, the prompt may be hydrated based on data from the user, including user role, user name, prior comments from the user within the content collaboration platform, pages associated with the user, user log data including recently-viewed pages, issue items in an issue tracking platform associated with the user, other cross-platform content associated with the user, or the like. Hydrating may generally refer to adding data to the prompt (e.g., context) described above. This user data may be provided, along with a portion of the content, as context in the prompt. In the example shown in FIG. 2B, @user2 may be a non-technical team member associated with a project. Accordingly, the comments or questions provided may be general knowledge or clarifying questions (e.g., selectable element 218*c*). In the user role example, comments from a user having an "AI Subject Matter Expert" role, for example, may be more tailored to sharing the user's knowledge in AI and thus the substance of the suggested comments may vary significantly.

In some examples, the comment generation service may be configured to perform a sentiment analysis on the tone and/or writing style of the user. For example, the comment generation service may extract data of prior comments written by the user, pages written by the user, and the like, to determine a writing style or the general tone of the user. The style and/or tone information may be used in the hydrated prompt as context for generating suggested comments. In some cases, the prior writings of a user may be provided in the hydrated prompt. For example, content items in which the user is an author may be extracted. In other examples, content items in which the user is an editor may be extracted. Each of the extracted content items may be used for a sentiment analysis to determine a tone and/or writing style of the user based on the extracted content. Afterwards, the predefined content of the prompt may include instructions for the generative output engine to generate comments based on the tone and/or writing style provided to the generative output engine. For example, if for @user2, prior comments have an informal style and frequently uses emojis, the generative output engine may provide suggested comments written in a similar informal style and may include an emoji in its output (see, e.g., selectable element 218*b*). Similarly, if prior comments from a user take an optimistic tone, the suggested comments may have a similar tone. As yet another example, if the user generally asks clarifying questions about the content in prior comments, the suggested comments may include at least one clarifying question (see, e.g., selectable element 218*c*).

In some cases, the comment generation interface 214 may include additional graphical elements, which allows the user to adjust an expected output for the suggested comments. As one example, the user may adjust the tone of the suggested comments (e.g., critical, optimistic, inquisitive). In response to adjusting the tone graphical interface element, a set of suggested comments may be replaced according to the selected tone. In other examples, the user may adjust the number of characters of the comment, the type of comment, and the like. In these examples, the user selections may be included as context in the prompt for output by the generative output engine.

In some examples, metadata extracted from the page may also be included as context in the prompt. In some cases, the metadata can include an author of the page. Based on the author of the page, the suggested comments output by the generative output engine may include a mention to the user. As another example, the metadata may include data on when the page was last updated. Based on this information, a comment targeted to a page that was recently updated or which is constantly updated (e.g., indicating a work in progress) may include more comments on future work or continuous improvement of the content. The examples provided above are merely for illustrative purposes and are not intended to limit the type or content of the output of the suggested comments.

Regardless of the context provided to the generative output engine to generate suggested comments, the predefined query may include a request to rank the output of the comments. Based on the ranking received, the user interface 200*b* may display higher-ranked suggested comments first, followed by lower-ranked comments. In some cases, the rankings may be based on a probability of @user2 selecting the suggested comment. In some examples, the rankings may be based on other criteria, such as comments providing insight or opinions having a higher ranking than questions.

Back to FIG. 2B, once @user2 selects a suggested comment from one of the selectable elements 218*a-c*, the comment may be posted as an in-line comment by the user, as shown in FIG. 2C. In his example, selectable element 218*b* was selected and posted as comment 220 (see FIG. 2C). In some cases, in response to the selection of the selectable element, the content of the suggested comment may be displayed in the editor region 216 as editable text. In this example, a user may edit the content of the generated comment prior to posting. In some cases, based on the edits of to the comments, additional suggested comments may be displayed. An example of this interface is provided in FIGS. 3A-3B.

FIG. 2C shows an example content collaboration platform user interface 200*c* where a comment may be generated based on an existing in-line comment. As shown in this example, once a user (e.g., @user2) posts a comment 220, the portion of the content 210 may be underlined to indicate to other users that the portion 210 includes a comment from a user. Generally, in-line comments may not be visible until a user scrolls over the portion 210 to reveal the comment 220 (e.g., as a pop-up window). In some examples, in-line comments may be part of a comment panel and each comment may be selectable to scroll to the portion 210 on the content panel 206.

In response to a user (e.g., @user3) selecting a "REPLY" user control to respond to comment 220, the user interface 200*c* may display the comment generation interface 222. Similar to the comment generation interface 214 described above, the comment generation interface 222 may include an editor region 224 and a set of suggested comments displayed as selectable elements 226*a-c*. In this example, the generated prompt may include the content of the comment 220 as prompt context data. In some cases, as discussed above, in addition to the content of the comment 220, the prompt may additionally include user data (e.g., user role), the portion of the content 210, part or some of the page content, page metadata, and the like. The predefined query may include instructions to reply to the particular comment 220, including data of the user that posted the comment.

The prompt generation service is configured to provide the context described above to the generative output engine. The output from the generative output engine may be used by a comment generation service to generate suggested comments. In this case, comment 220 is a question about other contexts under which other ML algorithms can be used. The suggested comments may include a link 225 to a different page explaining other uses (e.g., selectable element 226*a*), an invitation to discuss @user3's comments (e.g., selectable element 226*b*), or an affirmation to provide more visibility to the original poster (e.g., selectable element 226*c*).

The link 225 to the different page may be based on the commenting users' association with the page. For example, the different page may have been authored by @user3. In this example, content and/or other metadata from other pages associated with @user3 may be provided as context to the generative output engine. In this case, a portion of the content of each of the pages and/or all the content from each page may be provided to the generative output engine for determining its relevancy to the comment and for providing particular reference in the comment. More generally, the link 225 may be selectable to cause display of the different page within the content panel 206. In some cases, the link 225 may include a preview of the page (e.g., title, relevant passage) visible without navigating away from the current page. In some cases, content from an external content item (e.g., an issue item of a content collaboration platform) associated with the link may be extracted using an API. In some cases, a portion of the extracted content item may be previewed by the link.

While in the above example, the link 225 is to a page within the same content collaboration platform, in some cases, context provided to the generative output engine may include data about issue items managed by an issue tracking platform. For example, @user3 may be assigned to a particular issue item involving an ML algorithm. In this case, the generative output engine may provide a reference to this issue item. A selectable link may be generated that is operable to cause navigation to the issue tracking platform (following a successful authentication). Similarly, the prompt may include context from other platforms, such as a whiteboard, a project management platform, a Kanban board, and the like.

Figure 3A:
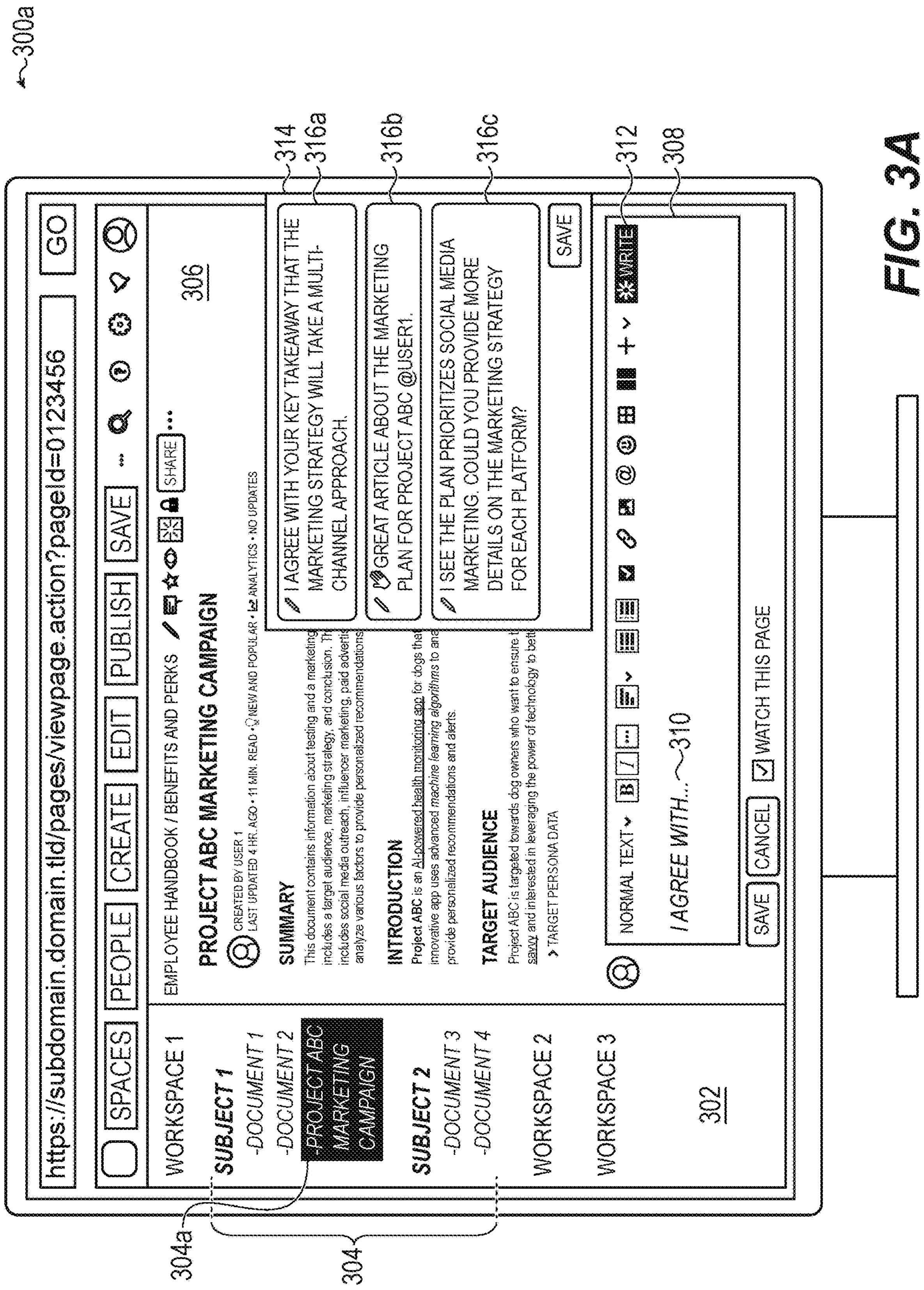
FIGS. 3A-3B depict an example user interface of a content collaboration platform that generates end-of-page comments within a page.
Figure 3B:
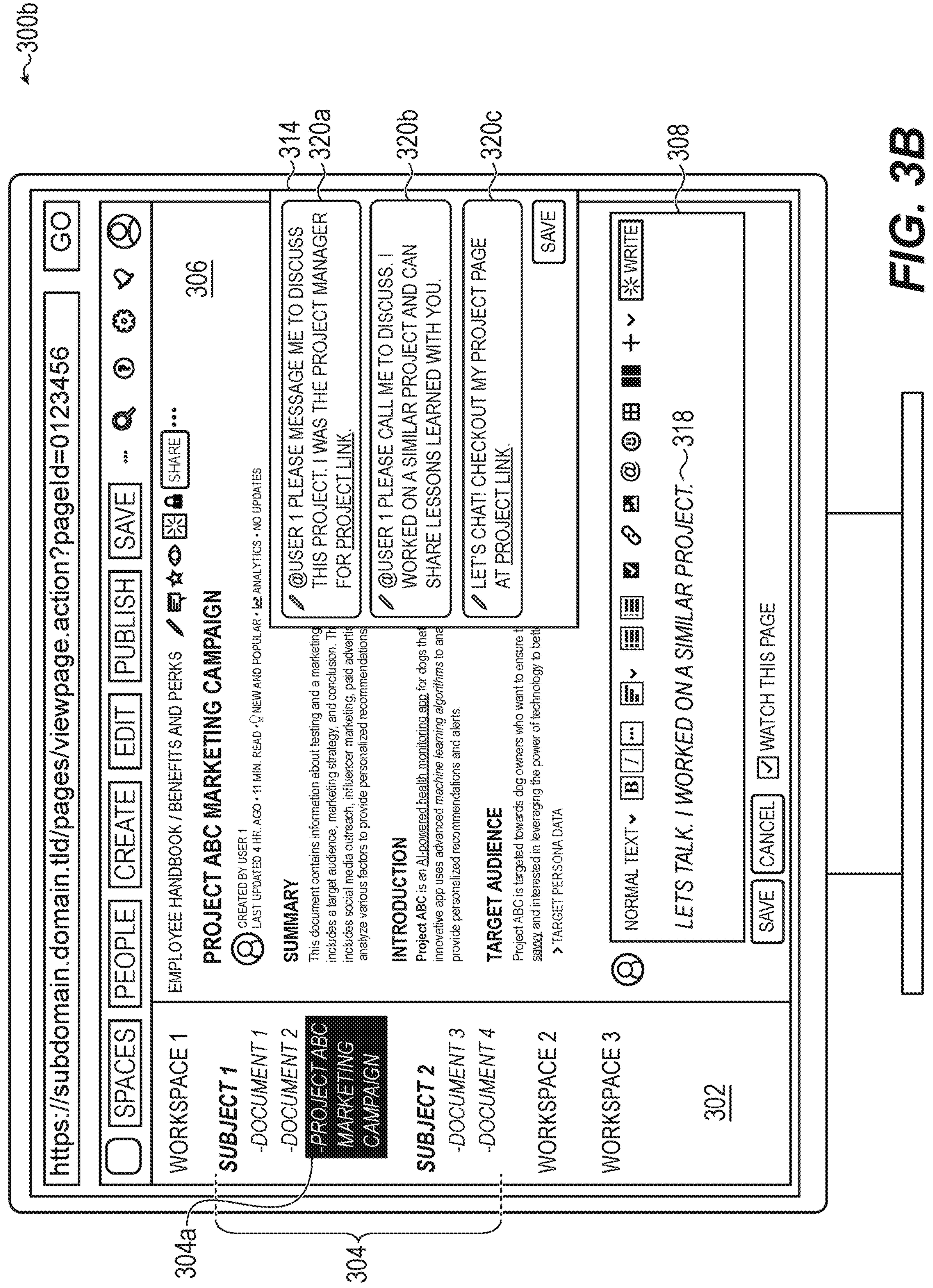

FIGS. 3A-3B depict an example graphical user interface of a content collaboration platform that automatically generates comments for a page. In this example, the comments are end-of-page (or general) comments. Unlike in-line comments, discussed above, end-of-page or general comments may be generally targeted at the entire content of a page and/or at an opinion of the user to the page as a whole. Thus, specific paragraphs and/or sentences are accorded less weight to generating a comment than in-line comments.

Similar to the graphical user interface discussed in FIG. 2A above, a graphical user interface 300*a* of FIG. 3A may include a navigational panel 302 having a page tree 304. The page tree 304 may be a graphical representation of tree elements hierarchically-arranged by a user and selectable to cause display of a page in a content panel 306. In this example, the page 304*a* titled PROJECT ABC MARKETING CAMPAIGN is selected and viewable in the content panel 306. The content panel 306 includes page content and may include a comment region 308. The comment region 308 may include a text editor and user controls which enable a user to leave comments in the page. In some cases, the comment region 308 may be visible upon scrolling to the end of the page. In some examples, the comment region 308 may be continuously visible in the content panel 306.

The comment region 308 may include prepopulated content 310. This prepopulated content 310 may be prepopulated to encourage users to leave comments and may be based on a user's style leaving comments (e.g., extracted from a user profile). In some cases, upon a user hovering or selecting user control 312 (WRITE), a comment generation interface 314 is displayed. The comment generation interface 314 may include a series of selectable elements 316*a-c* corresponding to a respective suggested comment, which may be generated via a generative output engine.

Similar to the methods explained as to FIGS. 2A-2C above, a comment generation service may be launched in response to the user selection of control 312. Since a portion of the page content is not selected in this case, the comment generation service may include all the content or a significant portion of the content of the page. In addition, the comment generation service may fetch additional context, such as user role, user logs, pages associated with the user, issues associated with the user, projects associated with the user, past user comments and tone, user writing style, and the like. Then, the content of the page and the additional context are provided to a prompt generation service along with a predefined prompt. Once submitted to the generative output engine (e.g., via an API), the output from the generative output engine may be evaluated and used to generate the comments of selectable elements 316*a-c*. In this example, the comments generated pertain to a takeaway or summary of the content of the page (see, e.g., selectable element 316*a*), an opinion or reaction to the article (see, e.g., selectable element 316*b*), and a question to encourage more discussion and collaboration on a related topic (see, e.g., selectable element 316*c*). In response to a user selecting a selectable element, the suggested comment is prepopulated in the comment region 308.

FIG. 3B shows an example graphical user interface 300*b* when a user inputs text in the comment region. In this example, in response to a user inputting text 318 in the comment region, the input text 318 may be used as context for the generated prompt that is fed into the generative output engine. As depicted, upon receiving a user input text, the suggested comments of selectable elements 316*a-c* (from FIG. 3A) are replaced with a new set of suggested comments, displayed as selectable elements 320*a-c*.

The new set of suggested comments may be based on the input text 318. For example, the input text includes "LETS [sic] TALK. I WORKED ON A SIMILAR PROJECT." The new set of suggested comments may correct typos introduced by the user and may provide a more appropriate writing style, according to a user role (in this example, project manager) of the user. Accordingly, selectable element 320*a* that includes a suggested comment may be displayed that includes: "@USER1 PLEASE MESSAGE ME TO DISCUSS THIS PROJECT. I WAS THE PROJECT MANAGER FOR PROJECT LINK." In this example, the prompt may include, as part as the context, the role of the user, the author of the page (e.g., metadata of the page), and pages associated with the user. Thus, the suggested comment can generate a link to a relevant page and a mention to the user, making the comment more useful to the reader and capturing the idea of the input text 318. In this example, the user can select a comment free of typos and which reflects the role of the user within the organization. Similarly, comments 320*b* and 320*c* capture the user's idea from the input text 318 in different tones and/or styles. At the prompt generation service, the input text 318 may be assigned more weight than the page content (e.g., by including additional instructions in the predefined prompt). Thus, the comments generated may be more relevant to the user's intended message in contrast to a generic formulation of comments.

Example Methods and Systems for Generating Comments Using Generative Output

Figure 4A:
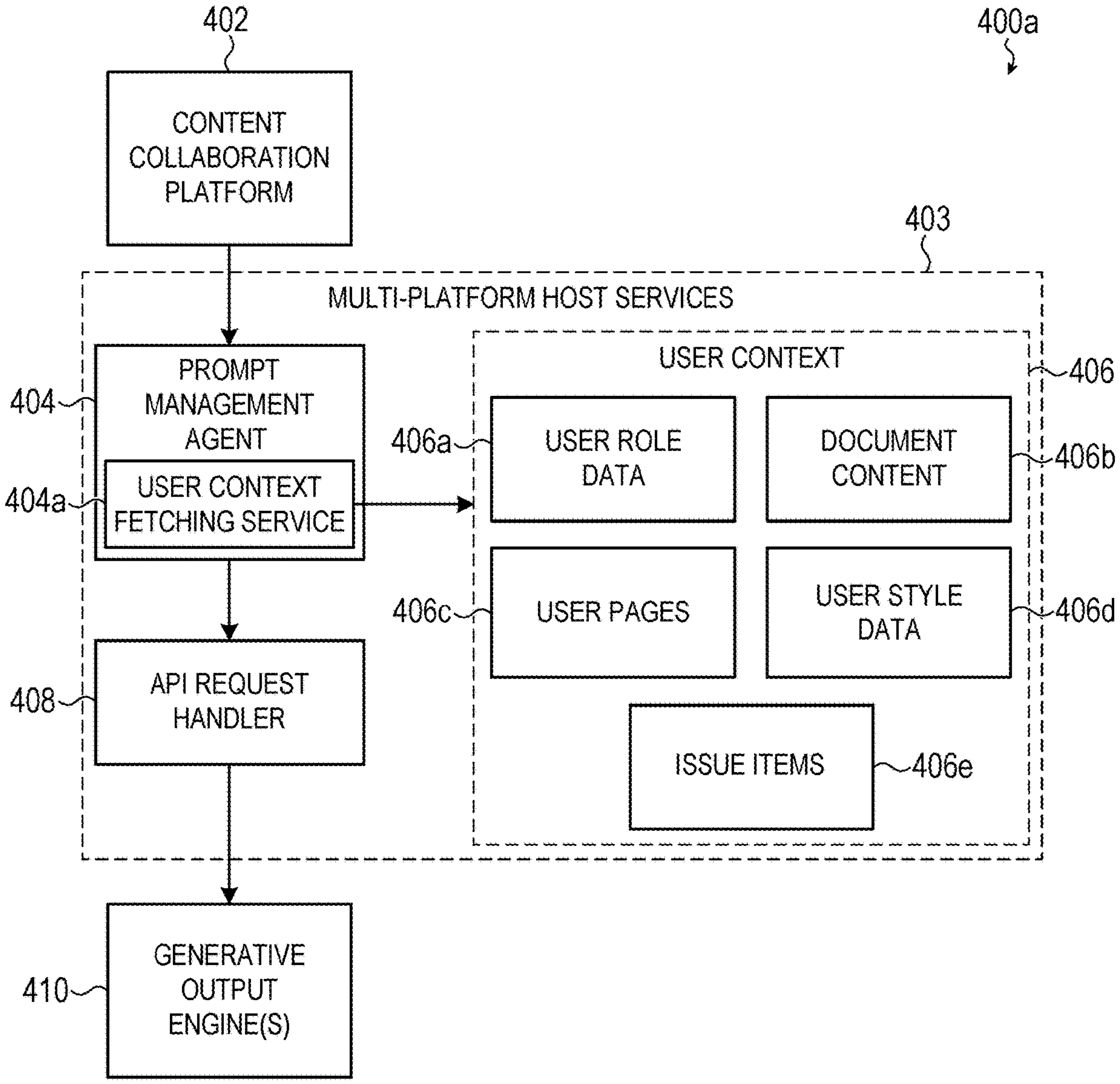
FIG. 4A depicts a simplified system diagram of a system of generating comments in a page of a content collaboration platform.

FIG. 4A shows a simplified diagram of a system 400*a* configured to generate comments in a content collaboration platform. As explained above, a content collaboration platform 402 may include interfaces for generating a comment in a page. In response to a selectable control at this user interface, the content collaboration platform frontend 402 communicates with a centralized multi-platform host services 403 to access a prompt management agent 404. The prompt management agent 404 is operable to access internal content within the multi-platform host services (e.g., from the multiple federated platforms used by the organization), communicate with external services, servers, and/or other API gateways.

The prompt management agent 404 may retrieve context data via a user context fetching service 404*a*. In some examples, the user context data may be retrieved from one or more federated applications, from third-party platforms and/or content, and from the content collaboration platform. In some cases, the system may build a user context profile for each user. The user context profile may be updated periodically as each user produces more content. In some examples, the user context profile may be based on pages, issues, projects, boards, or other content where a user is an author, assignee, participant, and the like. The user context profile may also include output from a sentiment analysis used to determine a particular tone, writing style, topic preference, or the like, of the user. This pre-assembled user context profile may be leveraged, in one example, to improve a processing speed of suggested comments. In other examples, the user context profile may be generated on an as-needed basis. In other examples, a user context profile may be built each time a suggested comment is requested as output from the generative output engine.

More generally, context may include page content, user data, user logs, and the like. The context fetching service 404*a* is also configured to access user context 406. This user context 406 may include user role data 406*a*, document content 406*b*, user page 406*c* (e.g., pages from the content collaboration platform associated with the user), user style data 406*d* (e.g., writing style extracted from other user comments and/or from other content generated by the user), issue items 406*e* (e.g., from an issue tracking platform), and the like.

The prompt management agent 404 may then compile the user context, including the page content, to configure a prompt to be submitted to the generative output engine 410. More specifically, the prompt management agent 404 may be configured to submit the prompt to an API request handler 408 which, in turn, communicates with the generative output engine 410.

Figure 4B:
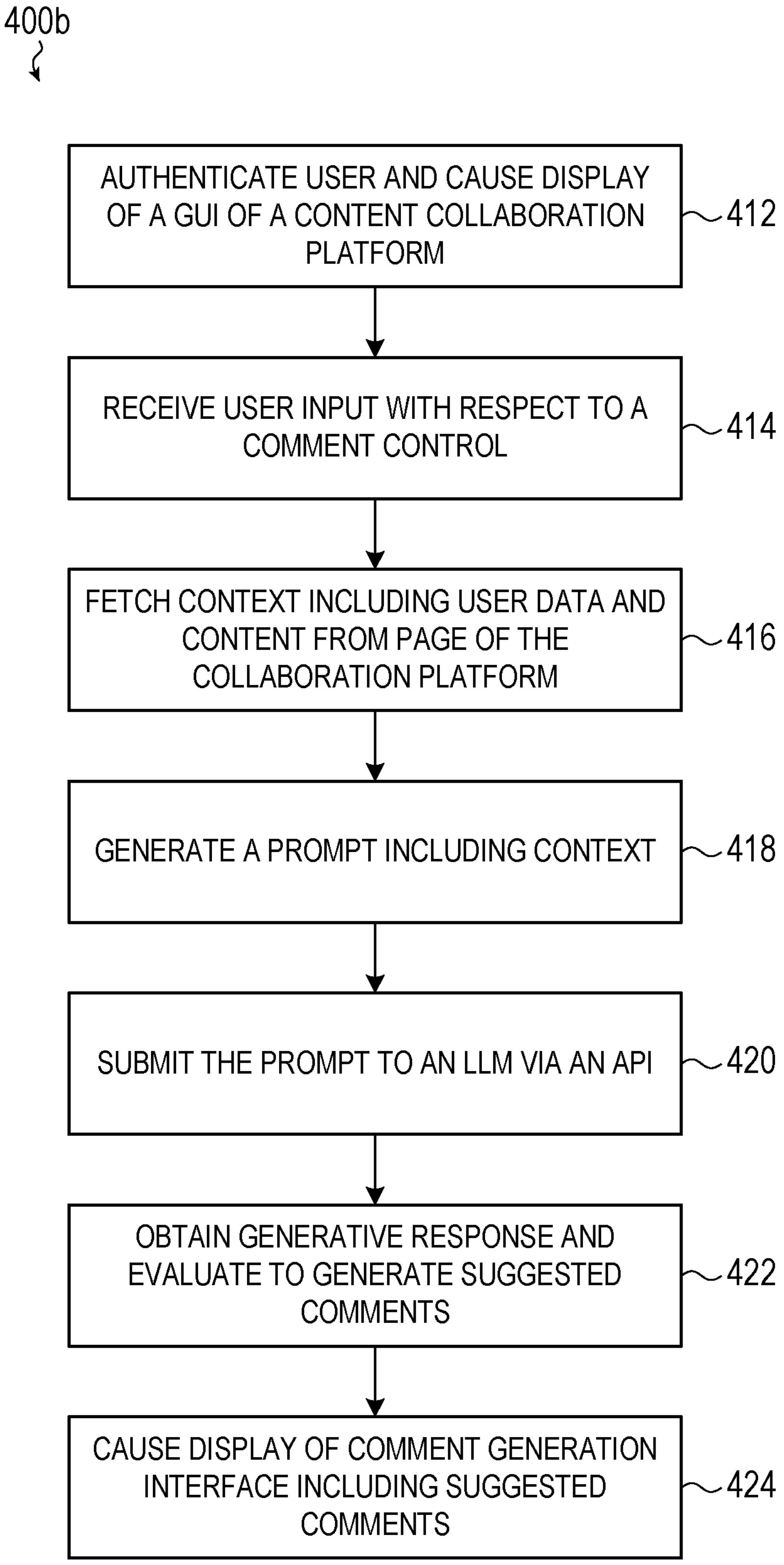
FIG. 4B depicts an example method for generating suggested comments in a page of a content collaboration platform.

FIG. 4B depicts a flowchart of an example method 400*b* for automatically generating suggesting comments by a backend application operably coupled to a frontend of a content collaboration platform. At operation 412, a user is authenticated and display of a graphical user interface (GUI) of a content collaboration platform is caused at the client device. As discussed above, the GUI of the content collaboration platform may include a particular page (or electronic document) that is part of a space of the content collaboration platform. The particular page may be displayed in the content region (also referred to as a content panel, content section, or content portion) of the GUI. The particular page may be highlighted in the navigational panel portion of the GUI and may be part of a hierarchical organization (user-defined) of the space that is displayed in the navigational panel. The particular page may include user-generated content, including text, images, videos, embedded content, links, and the like.

At operation 414, a user input with respect to a comment control is received. In some cases, the comment control may be displayed in response to a user selection of a particular portion of the content (e.g., a sentence, a word, a paragraph, an image, or the like). In some cases, the comment control may be generally to the page. For example, the comment control may refer to a "comment" button at the end of a page (e.g., without user selection of particular portions of the page). More generally, the comment control may be for in-line comments or general comments. In some cases, the comment control may be displayed as a pop-up window within the content region. In some cases, a separate region accessible to the user regardless of position with respect to the page may be displayed. Regardless of how the comment control feature is accessed, a user selection of this feature causes an instance of the user context service to be instantiated, which enables the generation of suggested comments.

At operation 416, context to be used to generate a prompt is fetched. As discussed above, the context may include user-specific and page-specific content. The user-specific content may be part of a user profile that includes a user role, user name, user contact information, and the like. In some cases, the user-specific content may include data of pages from the content collaboration platform for which the user is an author, editor, participant, creator, or the like. In some cases, the user-specific content may include data outside the content collaboration platform. For example, the user-specific content may include issue items associated with the user (e.g., issue items assigned to the user). In some cases, the user-specific content may include projects associated with the user (e.g., from a project management platform), repository events associated with the user (e.g., from a source code management platform), or the like. The page-specific content may include portions or all of the content from the page. The page-specific content may be assigned a higher weight in the prompt (e.g., via a predefined query) such that a suggested comment relates to the page-specific content (e.g., the topic, or specific portion of the content, or the like).

At operation 418, a prompt is generated that includes the fetched context and a predefined query. More specifically, a service may compile a prompt with a predefined query and include the user-specific context as well as the page-specific context to hydrate the prompt. The predefined query may include specific instructions on generating the suggested comments, privacy and other restrictions, and the like. Then, at operation 420, the generated prompt is submitted to the LLM via an API.

At operation 422, a generative output or response is obtained from the LLM (also referred to as an external generative output engine, or as a generative output engine). The generative output may include a list of comments. The system may evaluate this output and generate a set of suggested comments from the list of comments. The set of suggested comments are selectable graphical user items or selectable comment elements (e.g., pill-shaped buttons) that are displayed in a comment interface window. In some cases, the list of suggested comments may be ranked by the LLM and provided as output. For example, the predefined query may include a request to rank the output in accordance with a criteria. The criteria may include a weighing of more substantive comments first followed by questions. In some examples, the criteria may be based on the output that most closely matches the writing style of the user. In some cases, the criteria may be based on the tone of the comment. These examples are non-exhaustive.

Next, the system may evaluate the list of comments and select a portion of the comments to be used to create the list of suggested comments. In some cases, the system may evaluate the list of comments and select a sublist of comments based on existing comments from other users, style, length, or other selection criteria. At operation 424, the list of suggested comments are displayed in the GUI of the content collaboration platform.

Multiplatform Management of Generative Input and Output

The above description and examples provided with respect to FIGS. 1-4B focus on generating comments in a page of a content collaboration platform using a generative output system. As described below, this system may be part of a multiplatform environment with multiple platform backends and with centralized services that evaluate and queue requests that are input to the one or more generative engines.

Figure 5A:
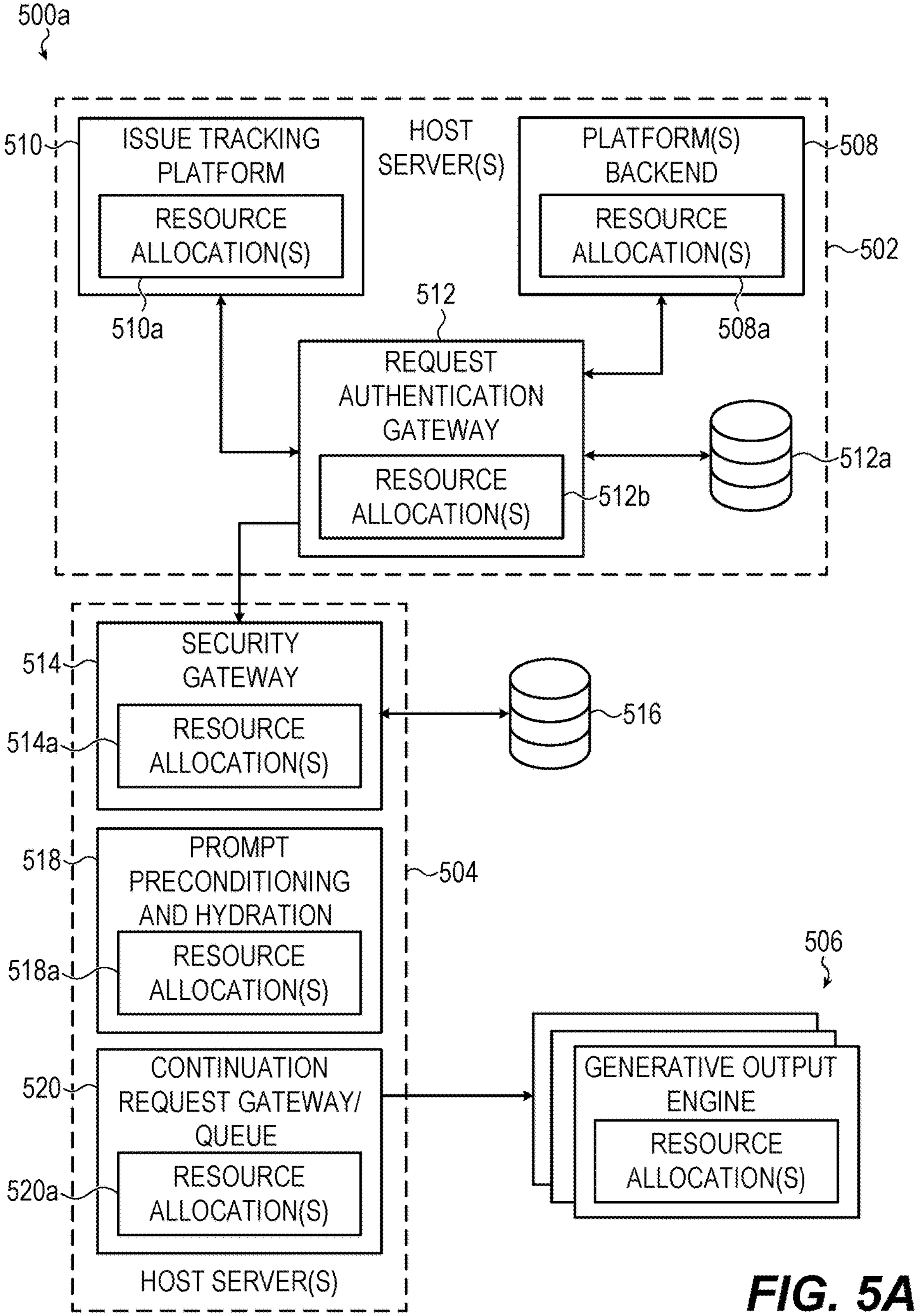
FIG. 5A depicts a simplified diagram of a system that can include and/or may receive input from a generative output engine.
Figure 5B:
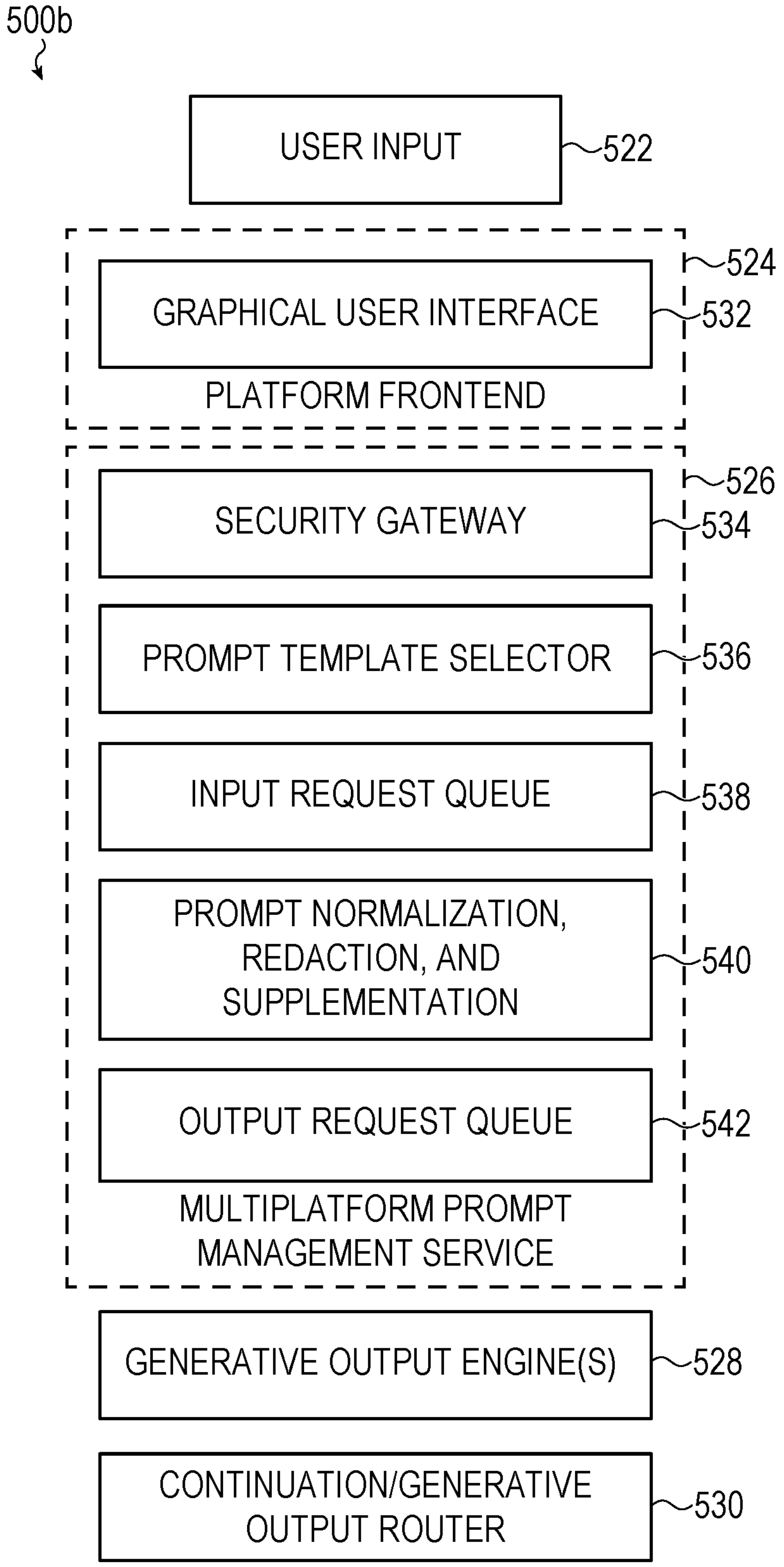
FIG. 5B depicts a functional system diagram of a system that can be used to implement a multiplatform prompt management service.

FIGS. 5A-5B depict system diagrams and network/communication architectures that may support a system as described herein. Referring to FIG. 5A, the system 500*a* includes a first set of host servers 502 associated with one or more software platform backends. These software platform backends can be communicably coupled to a second set of host servers 504 purpose configured to process requests and responses to and from one or more generative output engines 506.

Specifically, the first set of host servers 502 (which, as described above can include processors, memory, storage, network communications, and any other suitable physical hardware cooperating to instantiate software) can allocate certain resources to instantiate a first and second platform backend, such as a first platform backend 508 and a second platform backend 510. Each of these respective backends can be instantiated by cooperation of processing and memory resources associated to each respective backend. As illustrated, such dedicated resources are identified as the resource allocations 508*a* and the resource allocations 510*a*.

Each of these platform backends can be communicably coupled to an authentication gateway 512 configured to verify, by querying a permissions table, directory service, or other authentication system (represented by the database 512*a*) whether a particular request for generative output from a particular user is authorized. Specifically, the second platform backend 510 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 512 can deny the request for insufficient permissions. This example is merely one and is not intended to be limiting; many possible authorization and authentication operations can be performed by the authentication gateway 512. The authentication gateway 512 may be supported by physical hardware resources, such as a processor and memory, represented by the resource allocations 512*b*.

Once the authentication gateway 512 determines that a request from a user of either platform is authorized to access data or resources implicated in service that request, the request may be passed to a security gateway 514, which may be a software instance supported by physical hardware identified in FIG. 5A as the resource allocations 514*a*. The security gateway 514 may be configured to determine whether the request itself conforms to one or more policies or rules (data and/or executable representations of which may be stored in a database 516) established by the organization.

Once a particular user input (e.g., an input to generate subtasks) has been sufficiently authorized and cleared against organization-specific generative output rules, the request/prompt can be passed to a preconditioning and hydration service 518 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 518 can be a software instance supported by physical hardware represented by the resource allocations 518*a*. In some implementations, the hydration service 518 may also be used to rehydrate personally identifiable information (PII) or other potentially sensitive data that has been extracted from a request or data exchange in the system.

Once a prompt has been generated and hydrated by the preconditioning and hydration service 518, it may be passed to an output gateway 520 (also referred to as a continuation gateway or an output queue). The output gateway 520 can be a software instance supported by physical hardware represented by the resource allocations 520*a*. The output gateway 520 may be responsible for enqueuing and/or ordering different requests from different users or different software platforms based on priority, time order, or other metrics. The output gateway 520 can also serve to meter requests to the generative output engines 506.

FIG. 5B depicts a functional system diagram of the system 500*a* depicted in FIG. 5A. In particular, the system 500*b* is configured to operate as a multiplatform prompt management service supporting and ordering requests from multiple users across multiple platforms. In particular, a user input 522 may be received at a platform frontend 524. The platform frontend 524 passes the input to a prompt management service 526 that formalizes a prompt suitable for input to a generative output engine 528, which in turn can provide its output to an output router 530 that may direct generative output to a suitable destination. For example, the output router 530 may execute API requests generated by the generative output engine 528, may submit text responses back to the platform frontend 524, may wrap a text output of the generative output engine 528 in an API request to update a backend of the platform associated with the platform frontend 524, or may perform other operations.

Specifically, the user input 522 (which may be an engagement with a button, typed text input, spoken input, chat box input, and the like) can be provided to a graphical user interface 532 of the platform frontend 524. The graphical user interface 532 can be communicably coupled to a security gateway 534 of the prompt management service 526 that may be configured to determine whether the user input 522 is authorized to execute and/or complies with organization-specific rules.

The security gateway 534 may provide output to a prompt selector 536 which can be configured to select a prompt template from a database of preconfigured prompts, templatized prompts, or engineered templatized prompts. Once the raw user input is transformed into a string prompt, the prompt may be provided as input to a request queue 538 that orders different user request for input from the generative output engine 528. Output of the request queue 538 can be provided as input to a prompt hydrator 540 configured to populate template fields, add context identifiers, supplement the prompt, and perform other normalization operations described herein. In other cases, the prompt hydrator 540 can be configured to segment a single prompt into multiple discrete requests, which may be interdependent or may be independent.

Thereafter, the modified prompt(s) can be provided as input to an output queue at 542 that may serve to meter inputs provided to the generative output engine 528.

These foregoing embodiments depicted in FIGS. 5A-5B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 6A:
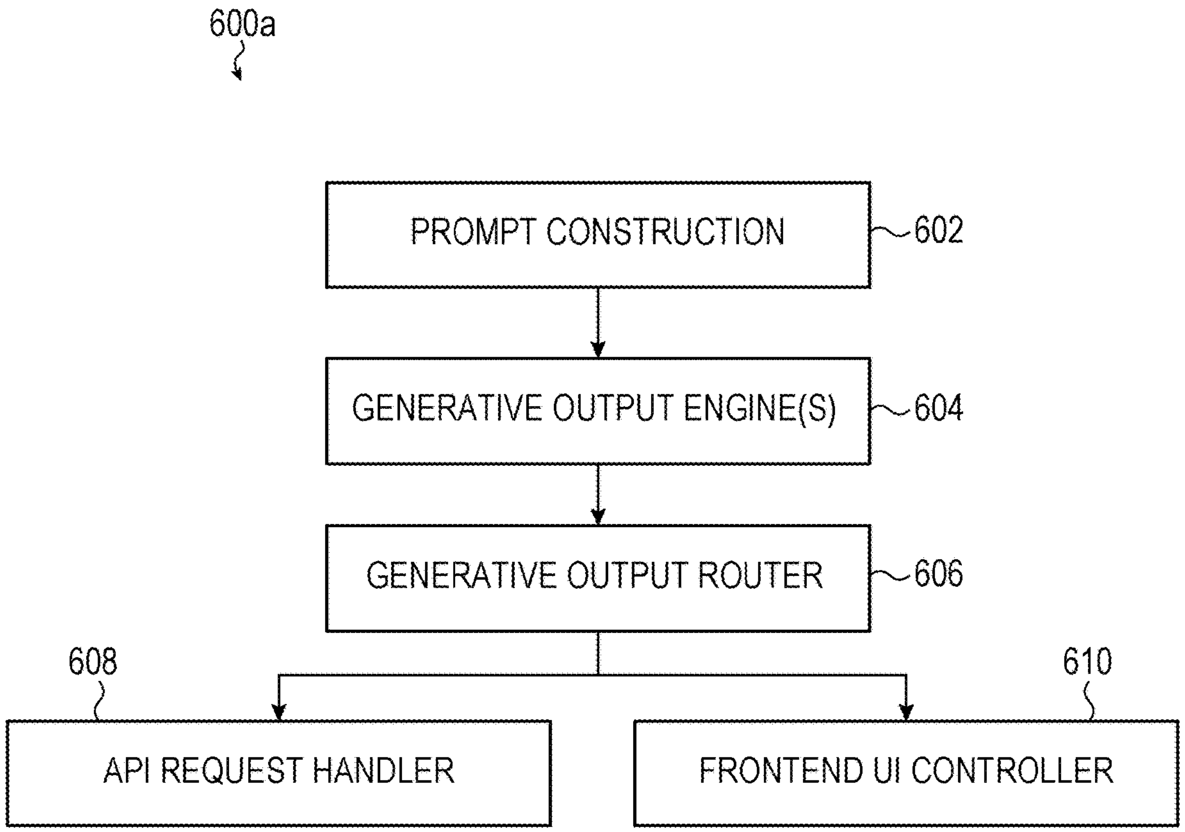
FIG. 6A depicts a simplified system diagram and data processing pipeline.

FIG. 6A depicts a simplified system diagram and data processing pipeline as described herein. The system 600*a* receives user input, and constructs a prompt therefrom at operation 602. After constructing a suitable prompt, and populating template fields, selecting appropriate instructions and examples for an LLM to continue, the modified constructed prompt is provided as input to a generative output engine 604. A continuation from the generative output engine 604 is provided as input to a router 606 configured to classify the output of the generative output engine 604 as being directed to one or more destinations. For example, the router 606 may determine that a particular generative output is an API request that should be executed against a particular API (e.g., such as an API of a system or platform as described herein). In this example, the router 606 may direct the output to an API request handler 608. In another example, the router 606 may determine that the generative output may be suitably directed to a graphical user interface/frontend 610.

Figure 6B:
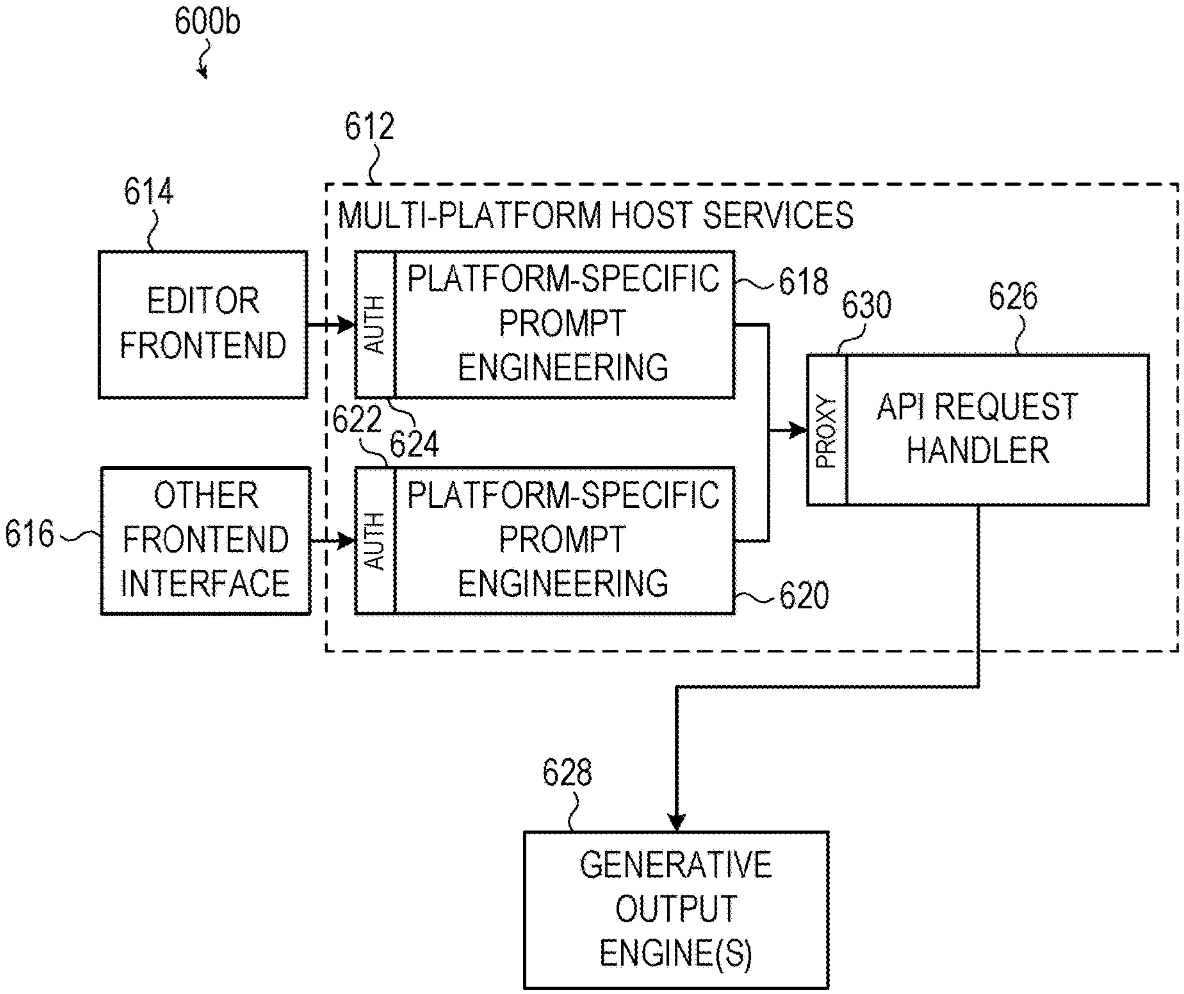
FIG. 6B depicts a system providing multiplatform prompt management as a service.

Another example architecture is shown in FIG. 6B, illustrating a system providing prompt management, and in particular multiplatform prompt management as a service. The system 600*b* is instantiated over cloud resources, which may be provisioned from a pool of resources in one or more locations (e.g., datacenters). In the illustrated embodiment, the provisioned resources are identified as the multi-platform host services 612.

The multi-platform host services 612 can receive input from one or more users in a variety of ways. For example, some users may provide input via an editor region 614 of a frontend, such as described above. Other users may provide input by engaging with other user interface elements 616 unrelated to common or shared features across multiple platforms. Specifically, the second user may provide input to the multi-platform host services 612 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

Once a prompt has been engineered/supplemented by one of the platform-specific prompt engineering services 618, 620, it may be passed to a request queue/API request handler 626 configured to generate an API request directed to a generative output engine 630 including appropriate API tokens and the engineered prompt as a portion of the body of the API request. In some cases, a service proxy 630 can interpose the platform-specific prompt engineering services 618, 620 and the request queue/API request handler 626, so as to further modify or validate prompts prior to wrapping those prompts in an API call to the generative output engine 628 by the request queue/API request handler 626 although this is not required of all embodiments.

Another example architecture is shown in FIG. 6B, illustrating a system providing prompt management, and in particular multiplatform prompt management as a service. The system 600*b* is instantiated over cloud resources, which may be provisioned from a pool of resources in one or more locations (e.g., datacenters). In the illustrated embodiment, the provisioned resources are identified as the multi-platform host services 612.

The multi-platform host services 612 can receive input from one or more users in a variety of ways. For example, some users may provide input via an editor region 614 of a frontend, such as described above. Other users may provide input by engaging with other user interface elements 616 unrelated to common or shared features across multiple platforms. Specifically, the second user may provide input to the multi-platform host services 612 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 612 can include multiple software instances or microservices each configured to receive user inputs and/or proposed prompts and configured to provide, as output, an engineered prompt. In many cases, these instances—shown in the figure as the platform-specific prompt engineering services 618, 620—can be configured to wrap proposed prompts within engineered prompts retrieved from a database such as described above.

In many cases, the platform-specific prompt engineering services 618, 620 can be each configured to authenticate requests received from various sources. In other cases, requests from editor regions or other user interface elements of particular frontends can be first received by one or more authenticator instances, such as the authentication instances 622, 624. In other cases, a single centralized authentication service can provide authentication as a service to each request before it is forwarded to the platform-specific prompt engineering services 618, 620.

Once a prompt has been engineered/supplemented by one of the platform-specific prompt engineering services 618, 620, it may be passed to a request queue/API request handler 626 configured to generate an API request directed to a generative output engine 630 including appropriate API tokens and the engineered prompt as a portion of the body of the API request. In some cases, a service proxy 630 can interpose the platform-specific prompt engineering services 618, 620 and the request queue/API request handler 626, so as to further modify or validate prompts prior to wrapping those prompts in an API call to the generative output engine 628 by the request queue/API request handler 626 although this is not required of all embodiments.

These foregoing embodiments depicted in FIGS. 5A-6B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

Figure 7:
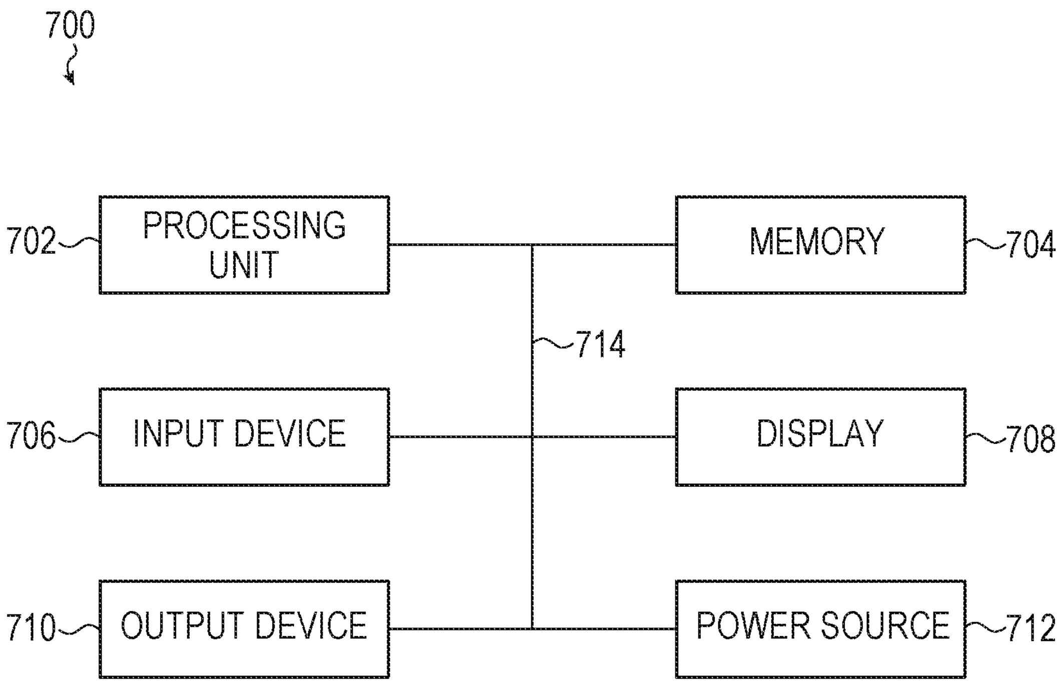
FIG. 7 depicts a sample electrical block diagram of an electronic device that may perform the operations described herein.

FIG. 7 shows a sample electrical block diagram of an electronic device 700 that may perform the operations described herein. The electronic device 700 may in some cases take the form of any of the electronic devices described with reference to FIG. 1, including client devices, and/or servers or other computing devices associated with the collaboration system 100. The electronic device 700 can include one or more of a processing unit 702, a memory 704 or storage device, input devices 706, a display 708, output devices 710, and a power source 712. In some cases, various implementations of the electronic device 700 may lack some or all of these components and/or include additional or alternative components.

The processing unit 702 can control some or all of the operations of the electronic device 700. The processing unit 702 can communicate, either directly or indirectly, with some or all of the components of the electronic device 700. For example, a system bus or other communication mechanism 714 can provide communication between the processing unit 702, the power source 712, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 708) may be controlled by a second processing unit, where the first and second processing units may or may not be in communication with each other.

The power source 712 can be implemented with any device capable of providing energy to the electronic device 700. For example, the power source 712 may be one or more batteries or rechargeable batteries. Additionally, or alternatively, the power source 712 can be a power connector or power cord that connects the electronic device 700 to another power source, such as a wall outlet.

The memory 704 can store electronic data that can be used by the electronic device 700. For example, the memory 704 can store electronic data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, flash memory, removable memory, other types of storage elements, or combinations of such devices.

In various embodiments, the display 708 provides a graphical output, for example associated with an operating system, user interface, and/or applications of the electronic device 700 (e.g., a chat user interface, an issue-tracking user interface, an issue-discovery user interface, etc.). In one embodiment, the display 708 includes one or more sensors and is configured as a touch-sensitive (e.g., single-touch, multi-touch) and/or force-sensitive display to receive inputs from a user. For example, the display 708 may be integrated with a touch sensor (e.g., a capacitive touch sensor) and/or a force sensor to provide a touch- and/or force-sensitive display. The display 708 is operably coupled to the processing unit 702 of the electronic device 700.

The display 708 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 708 is positioned beneath and viewable through a cover that forms at least a portion of an enclosure of the electronic device 700.

In various embodiments, the input devices 706 may include any suitable components for detecting inputs. Examples of input devices 706 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 includes a touch sensor (e.g., a capacitive touch sensor) integrated with the display 708 to provide a touch-sensitive display. Similarly, in some cases, the input device(s) 706 include a force sensor (e.g., a capacitive force sensor) integrated with the display 708 to provide a force-sensitive display.

The output devices 710 may include any suitable components for providing outputs. Examples of output devices 710 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method for generating comments in a page of a content collaboration platform, the method comprising:

subsequent to authenticating a user operating a client device, causing display of the page in a graphical user interface of the content collaboration platform, the graphical user interface comprising:

a navigational panel including an array of tree elements arranged hierarchically, each tree element of the array of tree elements selectable to cause display of a respective page; and a content region configured to display user-generated content of the respective page in a document editor;

receiving, within the content region, a first user input with respect to a comment control of the graphical user interface, the first user input including a selection of a particular portion of the user-generated content of the page;

in response to the first user input:

generating a prompt comprising:

prompt context data including a user role extracted from a user profile of the authenticated user and the particular portion of the user-generated content; and a predefined query including a request to generate at least two candidate comments based on the prompt context data;

providing the prompt to an external generative output engine using an application programming interface call;

obtaining a generative response from the external generative output engine; and in response to obtaining the generative response:
causing display of a comment generation interface comprising:
an editor region configured to receive user input; and
a set of selectable comment elements, each selectable comment element generated based on the generative response, each selectable comment element selectable by the user to cause entry of comment text within the editor region of the comment generation interface.

2. The method of claim 1, further comprising:
analyzing the particular portion of the user-generated content of the page with respect to a criteria, the criteria indicating a threshold amount of content;
in response to a determination that the particular portion of the user-generated content does not satisfy the criteria, extracting adjacent portions of user-generated content of the page, the adjacent portions including at least one sentence; and
generating the prompt using the particular portion of the user-generated content and the adjacent portions of the user-generated content as prompt context.

3. The method of claim 1, further comprising:
retrieving, from a database associated with the content collaboration platform:
metadata associated with the page; and
additional page text content different from the particular portion of the user-generated content of the page; and
hydrating the prompt to include the metadata and the additional page text content.

4. The method of claim 1, wherein:
the page is a first page; and
the method further comprises:
retrieving a second page of the content collaboration platform associated with the user, the second page different from the first page; and
in response to retrieving the second page, hydrating the prompt to include data from the second page.

5. The method of claim 4, further comprising:
performing a sentiment analysis on the second page of the content collaboration platform to determine at least one of a tone or a writing style of the user; and
adding instructions regarding results of the sentiment analysis to the prompt, the instructions including adopting the writing style of the user in the generative response.

6. The method of claim 1, wherein the prompt is a first prompt and further comprising:
receiving, at the editor region, a textual input from the user;
in response to the textual input from the user, generating a second prompt including the textual input from the user;
submitting the second prompt to the external generative output engine;
receiving an updated generative response from the external generative output engine based on the textual input from the user; and
replacing the set of selectable comment elements with an updated set of selectable comment elements.

7. The method of claim 1, wherein the particular portion of the user-generated content of the page is an in-line comment from a different user.

8. A method for automatically generating suggested comments in a content collaboration platform, the method comprising:
subsequent to authenticating a user operating a client application on a web browser, causing display of a page in a graphical user interface of the content collaboration platform, the graphical user interface of the content collaboration platform comprising:
a navigational panel including an array of tree elements arranged hierarchically, each tree element of the array of tree elements selectable to cause display of a respective page; and
a content region configured to display user-generated content of the respective page in a document editor, the content region comprising a comment region including a text input region and configured to receive and display user comments;
receiving, within the comment region, a comment request from the user;
in response to the comment request:
generating a prompt comprising:
prompt context data comprising:
a user attribute obtained from a user profile of the authenticated user;
document content from the page; and
an existing comment within the comment region; and
a predefined query including a request to generate at least two suggested comments based on the prompt context data;
submitting the prompt to an external generative output engine using an application programming interface call;
obtaining a generative response from the external generative output engine; and
in response to obtaining the generative response:
generating a set of suggested comments based on the generative response; and
causing display of a comment generation interface comprising a set of selectable comment elements, each selectable comment element selectable by the user to cause entry of a suggested comment from the set of suggested comments within the text input region of the comment region.

9. The method of claim 8, wherein the predefined query includes instructions for the generated at least two suggested comments to be different from the existing comment.

10. The method of claim 8, further comprising:
in response to receiving the comment request, requesting, from the authenticated user, a selection of a portion of the document content from the page;
subsequent to receiving the selection of the portion of the document content from the page, hydrating the prompt by adding the portion of the document content of the page; and
generating the set of suggested comments based on the generative response obtained from the hydrated prompt.

11. The method of claim 8, wherein the prompt is a first prompt and further comprising:
receiving, at the text input region, a textual input from the authenticated user;
generating a second prompt using:
at least a portion of the textual input; and
the predefined query including instructions to generate the set of suggested comments using the at least a portion of the textual input and a topic extracted from the at least a portion of the textual input; and subsequent to receiving an updated set of suggested comments, replacing the set of selectable comment elements based on the updated set of suggested comments.

12. The method of claim 8, wherein the user attribute is a user role of the authenticated user within the content collaboration platform.

13. The method of claim 8, wherein the user attribute includes a previous comment from the authenticated user on a different page within the content collaboration platform.

14. The method of claim 8, further comprising:

accessing, via an Application Programing Interface (API), a link path associated with an existing page;

generating a first suggested comment from the set of suggested comments including the link path, the link path including hosted data from the existing page; and causing display of the first suggested comment including the link path having a preview of the hosted data, the link path selectable to cause display of the existing page, the existing page different from the page.

15. A method for suggesting in-line comments in a page of a content collaboration platform, the method comprising:

subsequent to authenticating a user operating a client device, causing display of the page in a graphical user interface of the content collaboration platform, the graphical user interface of the content collaboration platform comprising:

a navigational panel including an array of tree elements arranged hierarchically, each tree element of the array of tree elements selectable to cause display of a respective page; and a content region configured to display user-generated content of the respective page in a document editor;

receiving, within the content region, a first user input with respect to a comment control of the graphical user interface, the first user input including a selection of a particular portion of user-generated content of the page;

in response to the first user input:

generating a prompt comprising:

prompt context data including:

a user role extracted from a user profile of the authenticated user;

a title of the page; and the selected particular portion of the user-generated content;

a predefined query including a request to generate at least two candidate comments based on the prompt context data;

providing the prompt to an external generative output engine using an application programming interface call;

obtaining a generative response from the external generative output engine; and in response to obtaining the generative response:

causing display of a comment generation interface comprising:

an editor region configured to receive user input; and a set of selectable comment elements, each selectable comment element generated based on the generative response, each selectable comment element selectable by the user to cause entry of comment text within the editor region of the comment generation interface;

receiving a selectable comment element from the set of selectable comment elements; and prepopulating the editor region with the selectable comment element from the set of selectable comment elements.

16. The method of claim 15, wherein the prompt is a first prompt and further comprising:

receiving, from the user, an edited portion of the selectable comment element;

generating a second prompt using at least the edited portion of the selectable comment element;

receiving, from the external generative output engine, an additional set of candidate comments; and replacing the set of selectable comment elements with an updated set of selectable comment elements, the updated set of selectable comment elements based on the additional set of candidate comments.

17. The method of claim 16, further comprising:

in response to a user selection of an additional selectable comment element from the updated set of selectable comment elements, adding the additional selectable comment element to the editor region including the selectable comment element.

18. The method of claim 15, wherein:

the prompt context data further comprises issue content from one or more issues hosted by an issue tracking platform, the one or more issues associated with the user; and at least one selectable comment element includes a graphical user interface element selectable to display a selectable link to an issue hosted by the issue tracking platform.

19. The method of claim 15, further comprising:

retrieving user access logs associated with the user, user access logs comprising other pages within the content collaboration platform associated with the user; and hydrating the prompt to include a portion of the user access logs including the other pages.

20. The method of claim 15, wherein:

the comment generation interface further comprises a tone control comprising a plurality of selectable tones; and the prompt further includes tone instructions that correspond to a particular tone of the plurality of selectable tones, the particular tone selected by the user.

* * * * *